United States Patent [19]

Sasaki et al.

[11] Patent Number: 6,122,005
[45] Date of Patent: *Sep. 19, 2000

[54] CAMERA CONTROL SYSTEM HAVING LIST OF CAMERA NAMES UPDATED IN ACCORDANCE WITH FREQUENCY OF USE AND OTHER EASE OF USE FEATURES

[75] Inventors: Akitomo Sasaki, Kawasaki; Eiji Kato, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/630,132

[22] Filed: Apr. 10, 1996

[30] Foreign Application Priority Data

Apr. 14, 1995 [JP] Japan ................................. 7-089637
May 19, 1995 [JP] Japan ................................. 7-121012

[51] Int. Cl.[7] .................................................. H04N 5/232
[52] U.S. Cl. ............................. 348/211; 348/15; 348/213
[58] Field of Search ................................. 348/211, 213, 348/15, 12, 13, 14, 143, 153, 159

[56] References Cited

U.S. PATENT DOCUMENTS

| | | | |
|---|---|---|---|
| 4,962,473 | 10/1990 | Crain | 364/900 |
| 4,992,866 | 2/1991 | Morgan | 348/153 |
| 5,218,627 | 6/1993 | Corey et al. | 348/16 |
| 5,515,099 | 5/1996 | Cortjens et al. | 348/6 |
| 5,528,289 | 6/1996 | Cortjens et al. | 348/211 |
| 5,583,565 | 12/1996 | Cortjens et al. | 348/15 |
| 5,598,209 | 1/1997 | Cortjens et al. | 348/211 |
| 5,640,195 | 6/1997 | Chida | 348/13 |
| 5,745,167 | 4/1998 | Kageyu et al. | 348/153 |
| 5,838,368 | 11/1998 | Masunaga et al. | 348/143 |
| 5,852,466 | 12/1998 | Komine et al. | 348/15 |
| 5,898,457 | 4/1999 | Nagao et al. | 348/15 |
| 5,917,543 | 6/1999 | Uehara | 348/15 |

FOREIGN PATENT DOCUMENTS

| | | | |
|---|---|---|---|
| 0 645 932 A1 | 3/1995 | European Pat. Off. | H04N 7/15 |
| 2 272 616 | 5/1994 | United Kingdom | H04N 7/00 |

OTHER PUBLICATIONS

Venkat Rangan, P., "Video conferencing, file storage, and management in multimedia computer systems," *Computer Networks and ISDN Systems*, vol. 25, pp. 901–919, North–Holland, 1993.

Patent Abstracts of Japan, vol. 015, No. 380 (P–1256), Sep. 25, 1991 & JP 03 149666 A (Matsushita Electric Ind Co. Ltd.), Jun. 26, 1991.

*Primary Examiner*—Vu Le
*Attorney, Agent, or Firm*—Morgan & Finnegan, LLP

[57] ABSTRACT

The name of one camera to be controlled is displayed in a camera-name display field of a camera control interface displayed on a screen. When a prescribed operation is performed, the names of cameras capable of being controlled are sorted in accordance with the degrees of frequency of use thereof so that the camera names are displayed in a list in order of decreasing frequency of use. By selecting one of the displayed camera names, the camera is selected as the camera to be controlled.

23 Claims, 32 Drawing Sheets

FIG. 17

CAMERA REGISTRATION

CAMERA NAME

Computer1

CAMERA NO.

1 ically showing a
CAMERA CONTROL SYSTEM HAVING LIST OF CAMERA NAMES UPDATED IN ACCORDANCE WITH FREQUENCY OF USE AND OTHER EASE OF USE FEATURES

BACKGROUND OF THE INVENTION

This invention relates to a camera control system for remotely controlling a video camera, as well as a method of controlling the system.

In a video communication conferencing system, a plurality of video cameras are connected to corresponding communication terminals and input video is transmitted among users via a communication line. Each user participates in the conference while viewing the video from a communicating party displayed on the monitor screen of the user's own terminal, and while viewing reference material and graphics as required. Data can be exchanged as well.

Ordinarily, the video camera connected to each terminal can be externally controlled so as to be panned, tilted and zoomed. Each terminal remotely controls the video camera, connected to the communication terminal of the communicating party, via the line.

Generally, when the video camera of a communicating party's terminal is remotely controlled in a conferencing system using a plurality of terminals, a list of the terminal names or video camera names participating in the conference is keyed in and one of the names is selected. A group of special-purpose keys provided on a keyboard or the like is then operated, key operation is converted to data for video camera control and the data are sent to the terminal selected.

However, the operation for specifying the target terminal or video camera relies upon human memory and therefore is very troublesome. In addition, the key operation is complicated and control cannot be performed correctly unless the user has a certain degree of skill.

SUMMARY OF THE INVENTION

An object of the present invention is to provide a camera control system that eliminates the difficulties mentioned above.

Another object of the present invention is to provide a camera control system in which, when a target camera is selected from a plurality of cameras, a camera list arranged in order of decreasing frequency of use is displayed to visually facilitate camera selection.

Still another object of the present invention is to provide a camera control system in which means for selectively designating the camera of a communicating party or one's own camera as the camera to be controlled is provided in a conference between two parties, thereby making it possible to toggle rapidly between the camera to be controlled and one's own camera without performing an operation for specifically selecting the camera to be controlled.

A further object of the present invention is to provide a camera control system which makes it possible to freely remotely control a plurality of cameras from any one of a plurality of control devices.

Still another object of the present invention is to provide a camera control system in which a plurality of cameras and one or more controllers are interconnected by a network and any camera can be remotely controlled from any one of the one or more control devices.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17 shows a registration window for registering remote cameras;

DESCRIPTION OF THE PREFERRED EMBODIMENTS

Embodiments of the present invention will now be described in detail with reference to the accompanying drawings.

As mentioned earlier, selecting a camera to be controlled is troublesome since the names of the cameras are keyed in one at a time.

Accordingly, it has been contemplated to display a camera control interface, which is for controlling the video camera of a communicating party's terminal as well as the video camera of one's own terminal, on a monitor screen, and have the user or operator select and operate a variety of graphical elements of the camera control interface at will using a pointing device such as a mouse, thereby panning, tiling and zooming the desired camera.

Figure 20:
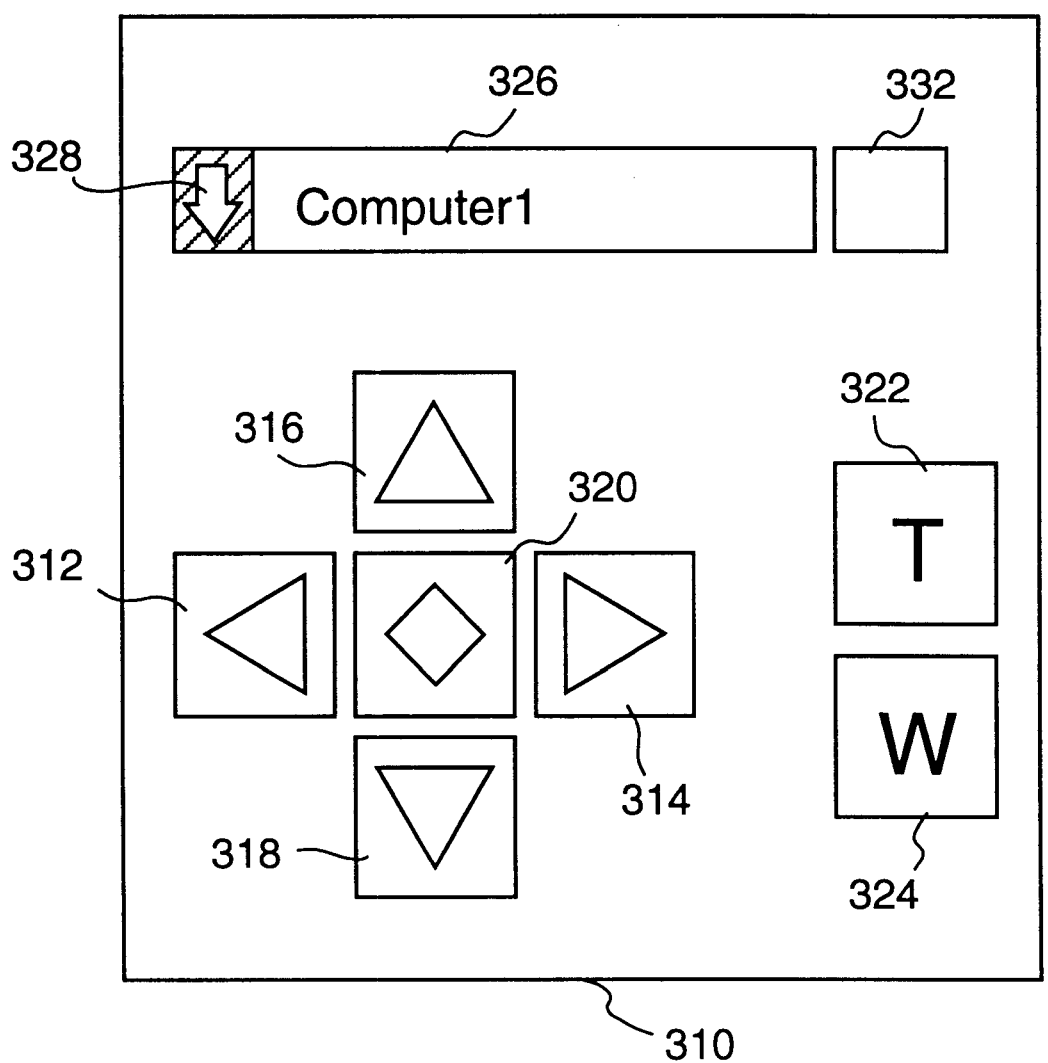
FIG. 20 shows a camera control interface.

FIG. 20 illustrates the camera control interface, indicated at 310. The camera interface 310 has a number of radio buttons for camera control, namely a left-pan button 312 for designating panning to the left, a right-pan button 314 for designating panning to the right, an upward tilt button 316 for designating upward tilting, a downward tilt button 318 for designating downward tilting, a home-position button 320 for designating restoration to a home position in a reference direction (usually forward), a telephoto button 322 for designating zooming in, and a wide-angle button 324 for designating zooming out.

Figure 21:
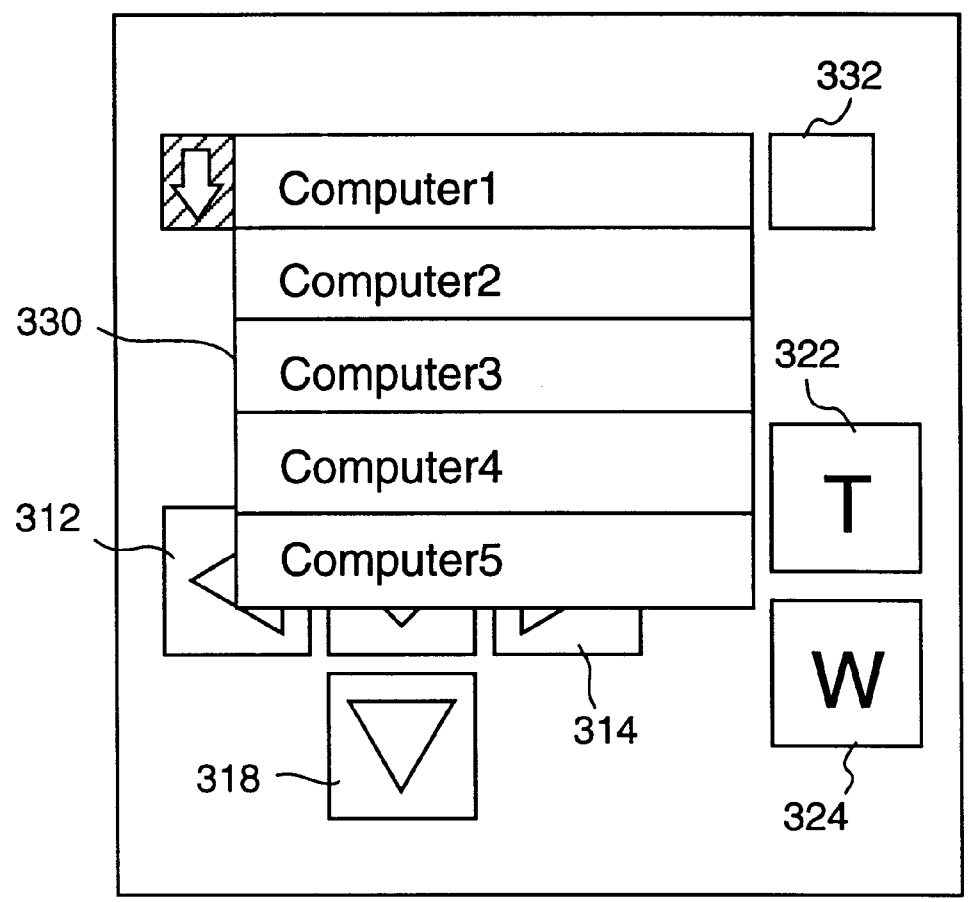
FIG. 21 shows an example of a pull-down menu.

The interface 310 has a camera name display field 326 for displaying the name of a camera to be controlled. When an expansion key 328 is clicked on, a list of all camera names capable of being controlled is displayed as a pull-down menu 330 below the camera name display field 326, as shown in FIG. 21. The camera name displayed in the camera name display field 326 is the camera name at the top of the pull-down menu 330. A registration radio button 332 is clicked on when it is desired to newly register a controlled camera in the pull-down menu 330.

Figure 22:
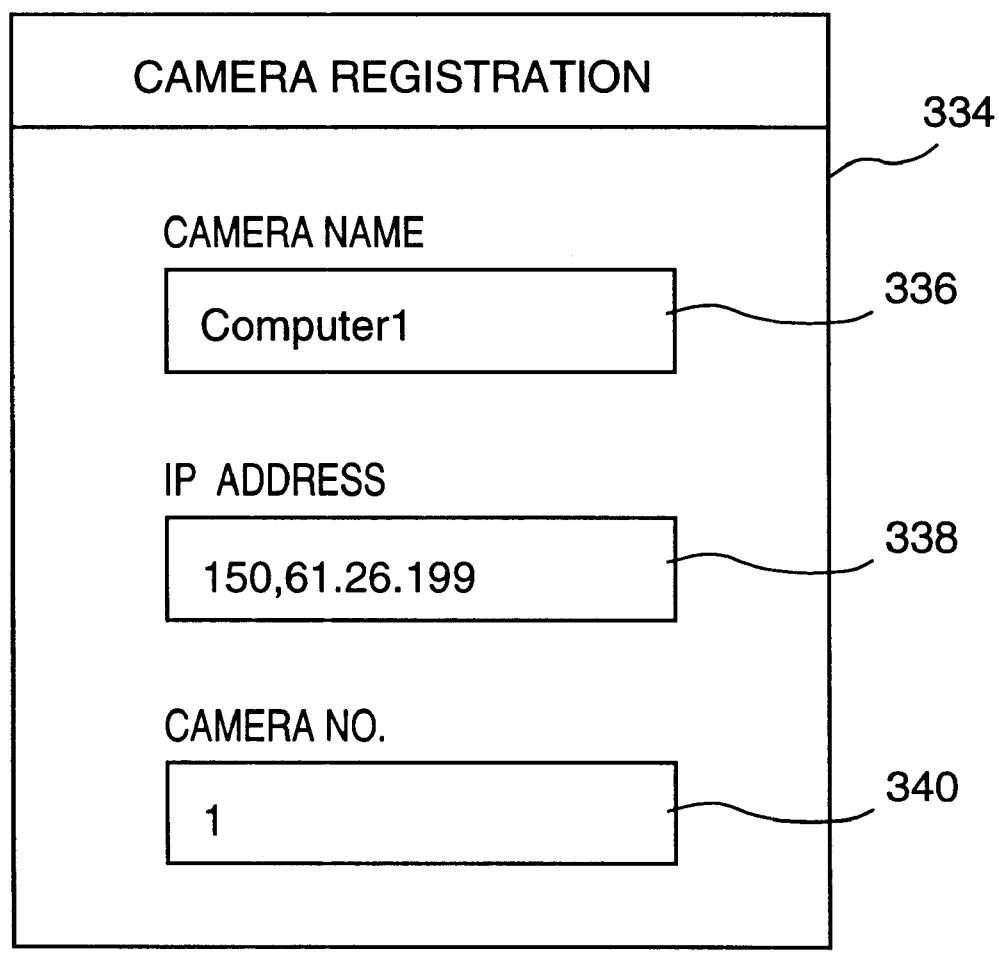
FIG. 22 shows an example of a camera registration window.

When the user clicks on the registration button 332 using a mouse, a registration window 334 shown in FIG. 22 is displayed on the monitor screen. The registration window 334 has a camera name input field 336, an IP address input field 338 and a camera number input field 340. A camera name ("Computer 1" in FIG. 22) desired to be added as a controllable camera is entered in the camera name input field 336 in the form of a character string that is easy for the user to understand. The computer-network IP address of the communication terminal connected to the camera desired to be added as a controllable camera is entered in the IP address input field 338. The number of the camera desired to be added, which camera is among those connected to the communication terminal specified by the IP address, is entered in the camera number input field 340. It should be noted that the term "connect" mentioned here refers to the control channel of the camera to be panned, tilted, etc.; it does not refer to the channel which transfers video.

The camera name that has been entered in the camera name input field 336 is displayed in the camera name display field 326 and pull-down menu 330. The camera specified by the camera name currently being displayed in the camera name display field 326 is the camera currently being controlled. Though the camera names are displayed in the pull-down menu 330 in the form of a list, as illustrated in FIG. 21, the order in which the names are displayed is fixed and is either the order in which the names were registered or the reverse of the order of registration.

In the arrangement described above, the pull-down menu displayed when a camera to be controlled is selected displays a list of camera names in a fixed order. Consequently, the camera used most frequently is not necessarily at the top of the list, thus making it troublesome to select the camera to be controlled.

Though an example of a video communication conference system has been described, this drawback is encountered also in a camera control system such as a video monitoring system using a large number of cameras. Such a system is installed at a monitor center at which individual cameras are selected and controlled.

The present invention solves the foregoing problem.

Figure 1:
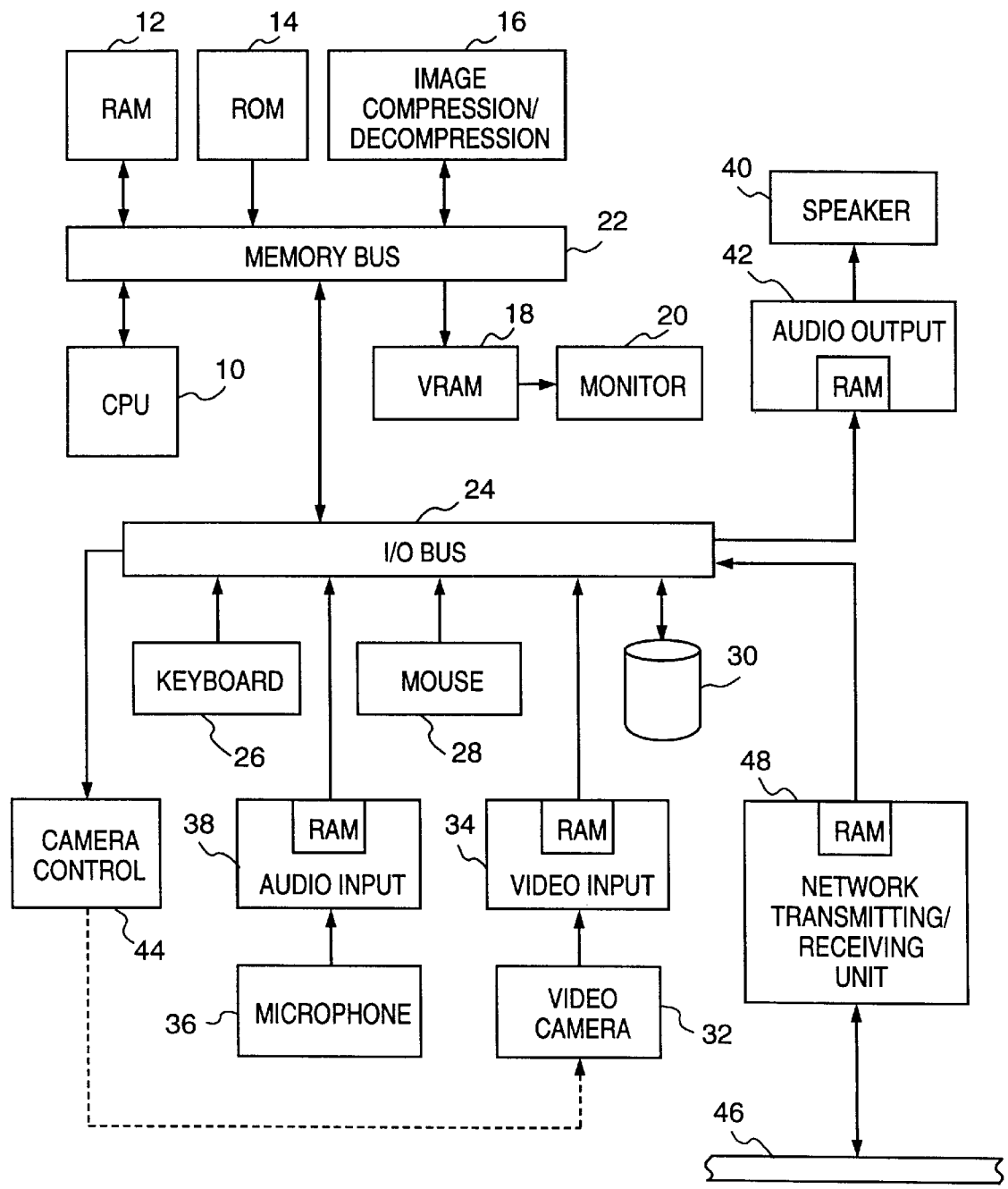
FIG. 1 is a block diagram schematically showing a communication terminal in an embodiment of the present invention.
Figure 2:
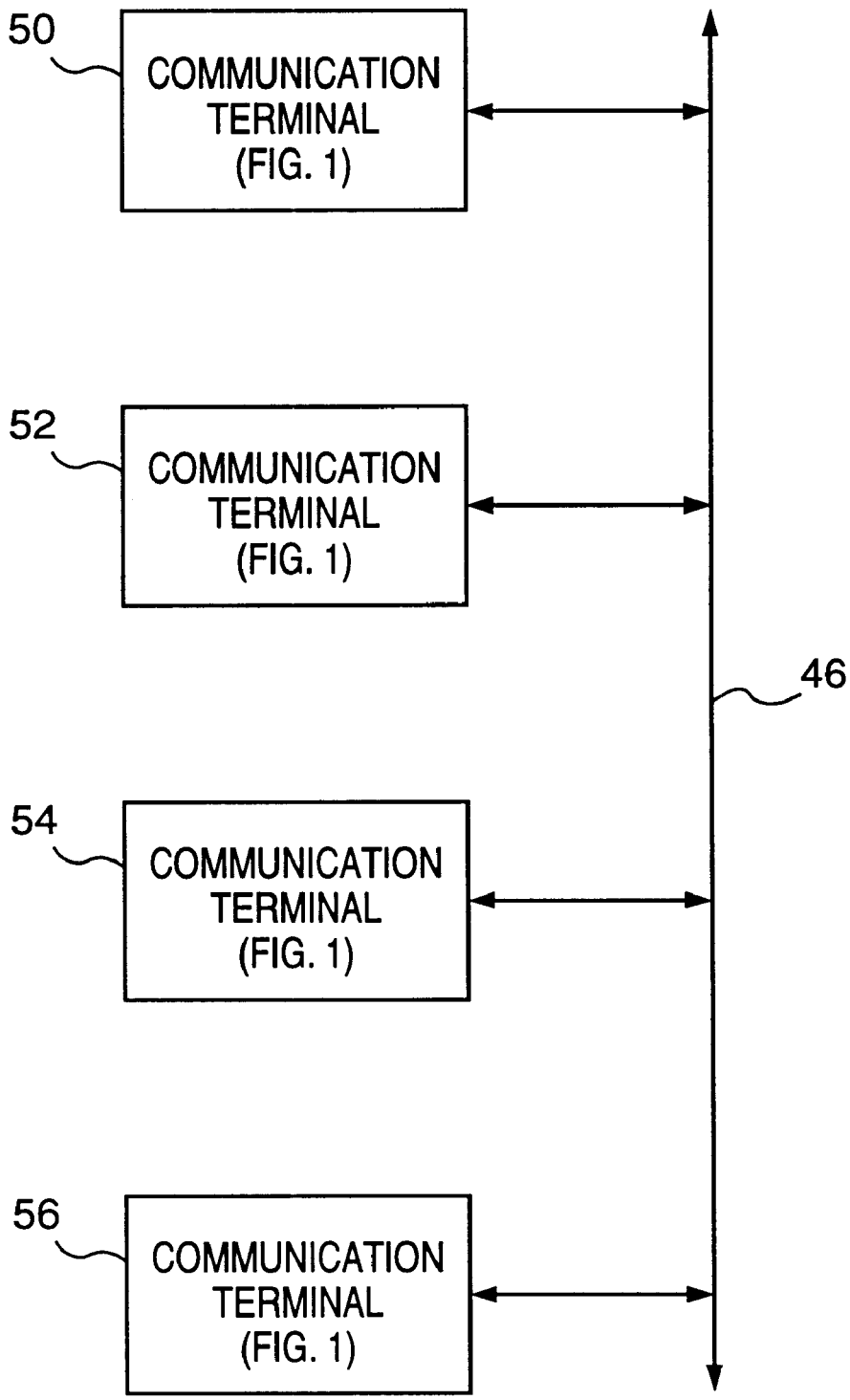
FIG. 2 is a diagram showing the general configuration of a video communication conferencing system in which four of the communication terminals illustrated in FIG. 1 are connected to a network.
Figure 3:
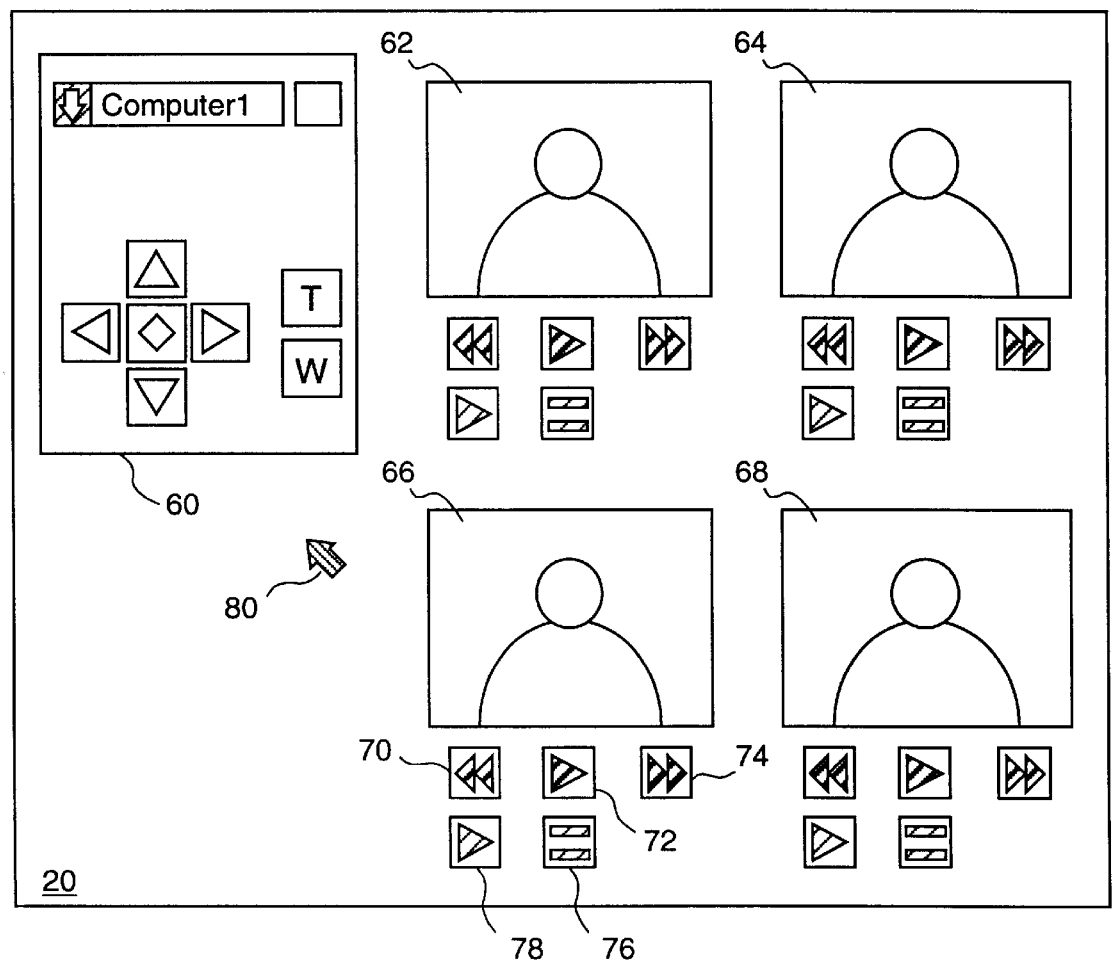
FIG. 3 illustrates an example of a monitor screen according to this embodiment.

An embodiment of the present invention applied to a video communication conferencing system will now be described. FIG. 1 is a block diagram schematically showing a communication terminal, FIG. 2 shows connections in a network, and FIG. 3 illustrates an example of a monitor screen.

The construction of the terminal shown in FIG. 1 will be described first. The terminal includes a CPU 10 for overall control, a RAM 12, a ROM 14 which stores a program for loading an operation system in the RAM 12, various other programs and fixed data, an image compression/decompression circuit 16 for compressing/decompressing image data, and a video memory 18 for storing image data to be displayed on a display monitor 20. These units are connected to a memory bus 22 and are capable of transferring data among one another.

An I/O bus 24 is also connected to the memory bus 22. Connected to the I/O bus 24 are a keyboard 26, a mouse 28, an external storage device (hard disk, etc.) 30, a video input unit 34 for connecting a video camera 32, an audio input unit 38 for connecting a microphone 36, an audio output unit 42 for supplying a speaker 40 with an audio signal, a camera control circuit 44 for controlling the panning, tilting and zooming of the video camera 32, and a network transmitting/receiving unit 48 connected to a network 46.

The video input unit 34 converts an analog video signal from the video camera 32 to a digital signal and stores the digital signal in an internal RAM. The audio input unit 38 converts an analog audio signal from the microphone 36 to a digital signal and stores the digital signal in an internal RAM. The CPU 10 is capable of accessing video data, which is stored in the RAM of the video input unit 34, and audio data, which is stored in the RAM of the audio input unit 38, via the memory bus 22 and I/O bus 24. The audio output unit 42, which has a RAM for temporarily storing the audio data from the I/O bus 24, successively converts the audio data stored in the RAM to an analog signal and applies the analog signal to the speaker 40.

A plurality of terminals 50, 52, 54, 56 having the construction shown in FIG. 1 are connected to the network 46, as illustrated in FIG. 2, in such a manner that these terminals will be capable of communicating video, audio and data among one another. This constructs a video communication conferencing system. The network 46 is a bus-type network such as an Ethernet (a LAN having a bus structure jointly developed by the Xerox, DEC and Intel corporations). However, the present invention is not limited to this particular network. In this embodiment, one video camera is connected to each of the four communication terminals to realize a conference among four parties.

FIG. 3 shows an example of a screen on the monitor 20. Numeral 60 denotes a camera control interface. In terms of its outward appearance, this interface is almost the same as that shown in FIG. 20. This interface is equipped with radio buttons for controlling photographic orientation and magnification, as well as a camera name display field displaying the camera to be controlled. A pull-down menu for selecting the camera to be controlled can be displayed. Though the details will be described later, the method of this embodiment for displaying the camera name list in the pull-down menu for selecting the camera to be controlled differs from that of FIG. 20. Numerals 62, 64, 66, 68 denote video display windows for displaying pictures from the video cameras 32 connected to respective ones of the communication terminals 50, 52, 54, 56 constructing the video communication conferencing system. Any one of the video display windows (window 62, for example) displays the picture from the terminal's own video camera 32. In to this embodiment, it is assumed that the conference is for communication among four parties, as shown in FIG. 2. Accordingly, the four video display windows 62, 64, 66 and 68 are provided.

At each terminal (see FIG. 1), the video signal captured by the video camera 32 and the audio entered from the microphone 36 are sent, via the network transmitting/receiving unit 48 and video-transfer channel, to the terminal of each user participating in the conference. Meanwhile, the video and audio are each successively stored in the external storage device 30. Since the video and audio constitute a large quantity of information even when compressed, information from several minutes back is stored. More specifically, in a case where five minutes of this information is stored, old information is successively overwritten so that the latest five minutes of video and audio will always be stored in the external storage device. Since the audio and video are continuous, they are stored at suitable intervals (e.g., at intervals of five seconds), with the oldest data being overwritten.

The video display windows 62, 64, 66 and 68 can be utilized to play back recorded video stored in the corresponding communication terminals. To this end, playback control radio buttons (a rewind button 70, a playback-start button 74, a fast-forward button 74 and a playback-stop button 76), as well as a changeover radio button 78 for changing over between recorded video and live video, are arrayed below each of the video display windows 62, 64, 66 and 68. It goes without saying that as long as there is enough space on the screen of the monitor 20, the screen can be provided with additional video display windows to display live video and recorded video from additional terminals.

A mouse cursor 80 can be moved freely by the mouse 28, as well known. By performing a prescribed operation using the camera control interface 60 and the various radio buttons 70~78, the user can apply desired commands to the CPU 10.

The basic operation for transmitting video and audio data via the network 46 will now be described. The video input unit 34 converts the analog video signal from the video camera 32 to a digital signal and develops the digital signal in the internal RAM. The CPU 10 reads in the video data from the internal RAM of the video input unit 34, develops video data in the RAM 12, forms the data into a packet and outputs the same to the network 46 from the network transmitting/receiving unit 48. The packet is transferred from another terminal, say terminal 50, to terminals 52, 54 and 56 via the network 46.

Upon sensing arrival of the packet from the network 46, the network transmitting/receiving unit 48 develops the packet in the internal RAM and notifies the CPU 10 of the fact that the packet has been received. The CPU 10 reads the data out of the RAM in the network transmitting/receiving unit 48 and develops these data in the RAM 12. The CPU 10 fetches the video data contained in the packet and writes the video data in the VRAM 18 at a prescribed location thereof. For example, when this video is to be displayed in the video display window 64, the video is written at an address of the VRAM 18 that corresponds to the video display window 64. As a result, the video from the other communication terminals is displayed in the video display windows 62~68 respectively allocated thereto.

The audio that has entered from the microphone 36 is converted to a digital signal by the audio input unit 38 and the digital signal is developed in the internal RAM. The CPU 10 reads the audio data out of the RAM in the audio input unit 38, develops these data in the RAM 12, forms the data into a packet and outputs the packet to network 46 from the network transmitting/receiving unit 48. This packet is transferred from another terminal, say terminal 50, to the terminals 52, 54 and 56 via the network 46.

Upon sensing arrival of the packet from the network 46, the network transmitting/receiving unit 48 develops the packet in the internal RAM and notifies the CPU 10 of the fact that the packet has been received. The CPU 10 reads the data out of the RAM in the network transmitting/receiving unit 48 and develops these data in the RAM 12. The CPU 10 fetches the audio data contained in the packet and writes the audio data in the internal RAM of the audio output unit 42. The audio output unit 38 converts the audio data stored in the internal RAM to an analog signal and applies the analog signal to the speaker 40. As a result, the audio from one or a plurality of other communication terminals is outputted as an audible signal.

In response to operation of a radio button on the camera control interface 60 by means of the mouse 28, the CPU 10 generates a camera control command conforming to the type of operation performed, thereby designating the camera to be controlled as well as the terminal connected to this camera, forms this camera control command into a packet and outputs the packet to the network 46 from the network transmitting/receiving unit 48. The designated terminal accepts the packet containing the camera control command from the network 46 and, upon verifying that the camera control command is contained in this packet, transfers this camera control command to the camera control circuit 44. In dependence upon the entered camera control command, the camera control circuit 44 controls such motions as the panning, tilting and zooming of the video camera 32. Thus, it is possible to control not only the video camera connected to the user's own terminal but also the video cameras connected to the other terminals, this being done via the network 46.

Thus, a communication conference using audio and video can be performed among four parties and the video camera connected to other terminals can be remotely controlled.

The details of the camera control interface 60 will now be described with reference to FIG. 4.

Figure 4:
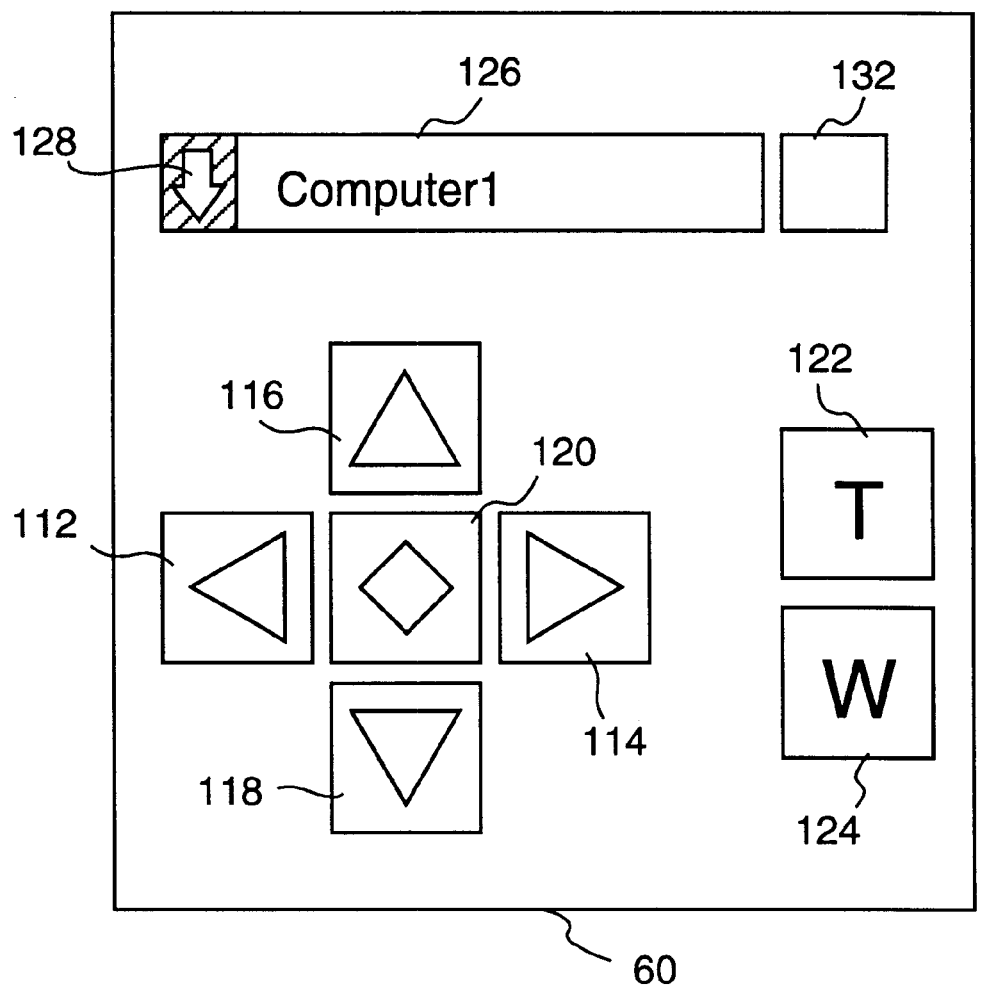
FIG. 4 illustrates the details of construction of a camera control interface.

FIG. 4 shows the details of construction of the camera control interface 60. As mentioned earlier, this interface is the same as that of FIG. 20 in terms of outward appearance. The only difference is the method of displaying the list of camera names in the pull-down menu for selecting the camera to be controlled. More specifically, the camera interface 60 has a number of radio buttons for camera control, namely a left-pan button 112, a right-pan button 114, an upward tilt button 116, a downward tilt button 118, a home-position button 120, a telephoto button 122 and a wide-angle button 124. The interface 60 further includes a camera name display field 126 for displaying the name of a camera to be controlled.

Figure 5:
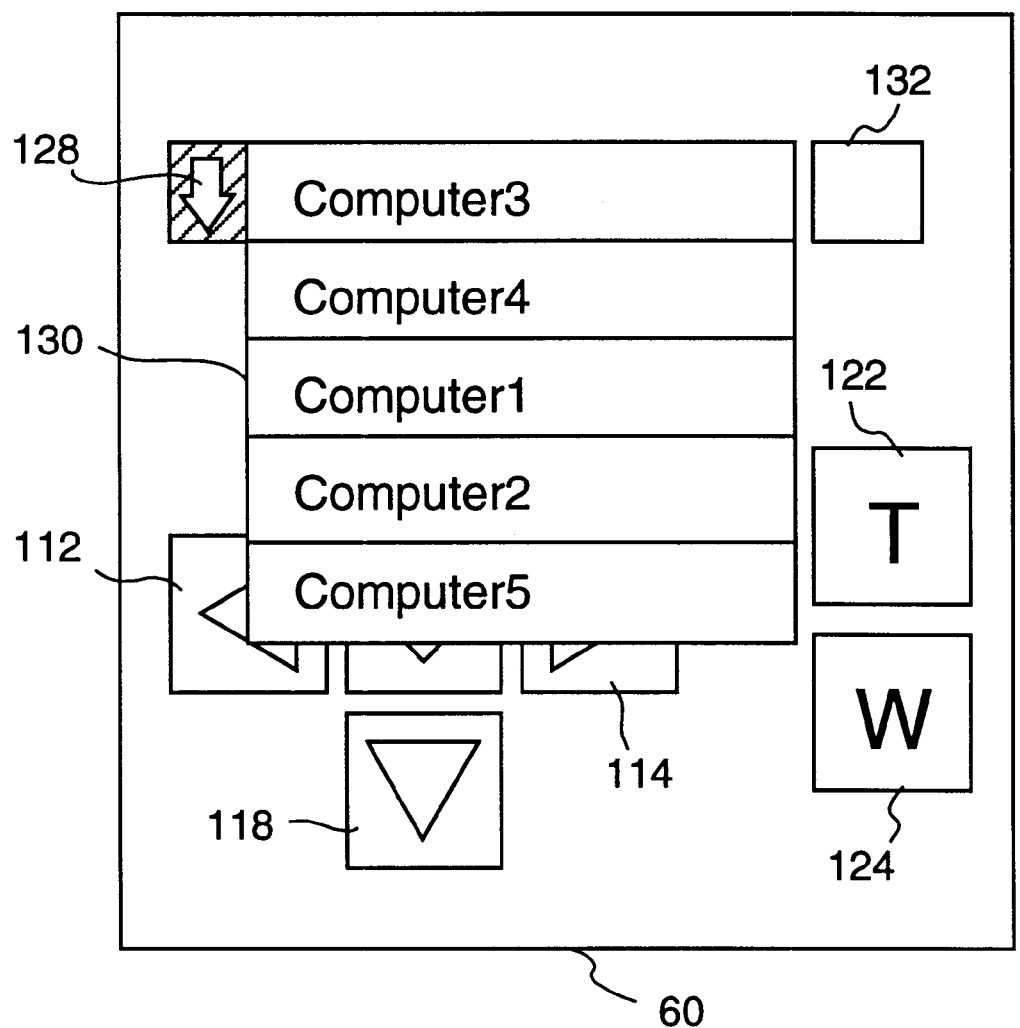
FIG. 5 shows an example of the display of a pull-down menu.

When an expansion key 128 next to the camera display field 126 is clicked on, a list of all camera names capable of being controlled is displayed as a pull-down menu 130 below the camera name display field 126, as shown in FIG. 5. The camera name displayed in the camera name display field 126 is the camera name at the top of the pull-down menu 130. In this embodiment, the order in which the camera names are displayed in the pull-down menu 130 is neither the order of registration nor the reverse thereof. Rather, the names are listed in the order of decreasing frequency of use, with the name of the camera used most frequently being displayed in the camera display field 126. A registration radio button 132 is clicked on when it is desired to newly register a controlled camera in the pull-down menu 130.

In this embodiment also, when the user clicks on the registration button 132 using a mouse, the registration window 334 shown in FIG. 22 is displayed on the monitor screen. The camera name of a camera desired to be added as a controllable camera, the IP address of the terminal connected to this camera and the camera number can be entered using the window 334.

The operation of a camera control program for managing the camera control interface 60 will now be described in detail. In a case where one, two or more cameras have already been registered as controllable cameras, this registration file is loaded from the external storage device 30 and the number of cameras and camera names are set as predetermined variables. In the description that follows, however, a case in which camera names and the like are registered for the very first time will be set forth.

Figure 6:
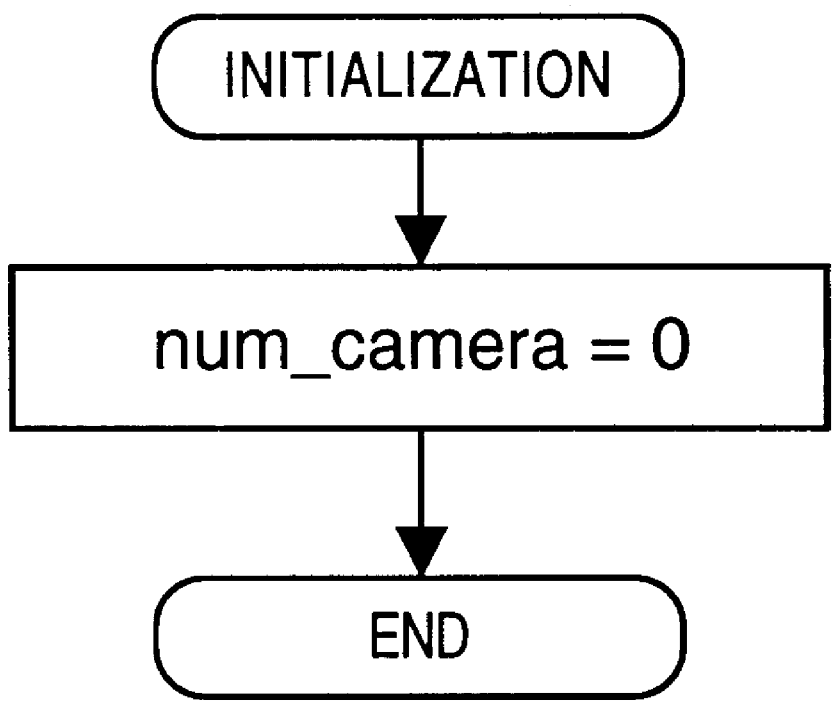
FIG. 6 is a flowchart showing an initializing routine of a camera control program.

When the camera control program is started up, first the initializing subroutine shown in FIG. 6 is executed to substitute "0" into the variable num_camera. The variable num_camera is a global variable which indicates the total number of video cameras capable of being controlled.

The clearing of the variable num_camera to "0" is performed when the conferencing system is introduced to the terminal or when an environment file that has been stored in the external storage device 30 is intentionally deleted. In other words, in a case where a video communication conference has been held previously and the present conference is the second or a subsequent conference, the value in the environment file that has been stored in the external storage device 30 is substituted into the variable num_camera.

Figure 7:
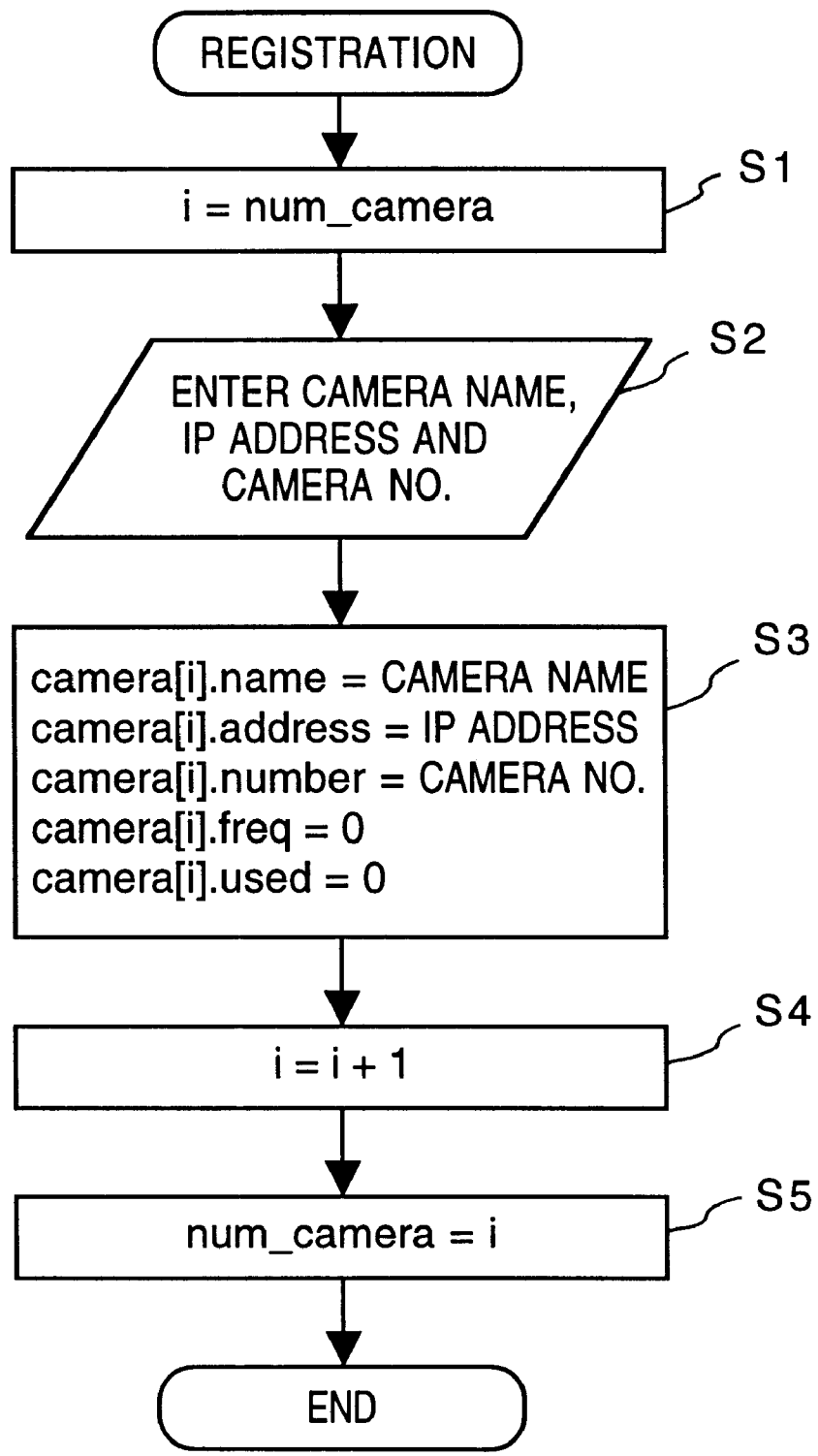
FIG. 7 is a flowchart of a camera registration routine.

When the registration button 132 is clicked on, the input data are set in prescribed variables in accordance with the flowchart shown in FIG. 7. Specifically, the value of num_camera is substituted into a local variable i (step S1). Owing to the initializing operation shown in FIG. 6, the value of num_camera is "0" at this time. Next, the registration window shown in FIG. 22 is displayed to prompt the user to enter the video camera name, the network address of the communication terminal connected to this video camera and the number of the video camera of this communication terminal (step S2). The reason for entering the camera number is to deal with a case in which a plurality of video cameras have been connected to one communication terminal. In this embodiment, only one video camera is connected to one communication terminal.

When entry is finished, the camera name, the network address and the camera number are substituted into an array variable camera [i].name, an array variable camera [i].address and an array variable camera [i].number, respectively. Further, "0" substituted into an array variable camera [i].freq and an array variable camera [i].used (step S3). The variable camera [i].freq is a counter which counts the frequency of use of the corresponding video camera, and the variable camera [i].used is a flag used when the order of display in the pull-down menu 130 is decided.

It should be noted that a variable which begins with camera [] is a structure (often used in the computer language C). The IP address of an ith video camera is obtained by camera[i].address.

Next, the value of the local variable i is incremented (step S4) and the value of the variable i is substituted into the variable num_camera (step S5), thereby ending this routine. At this time the variable num_camera in the environment file stored in the external storage device 30 also is updated.

Figure 8:
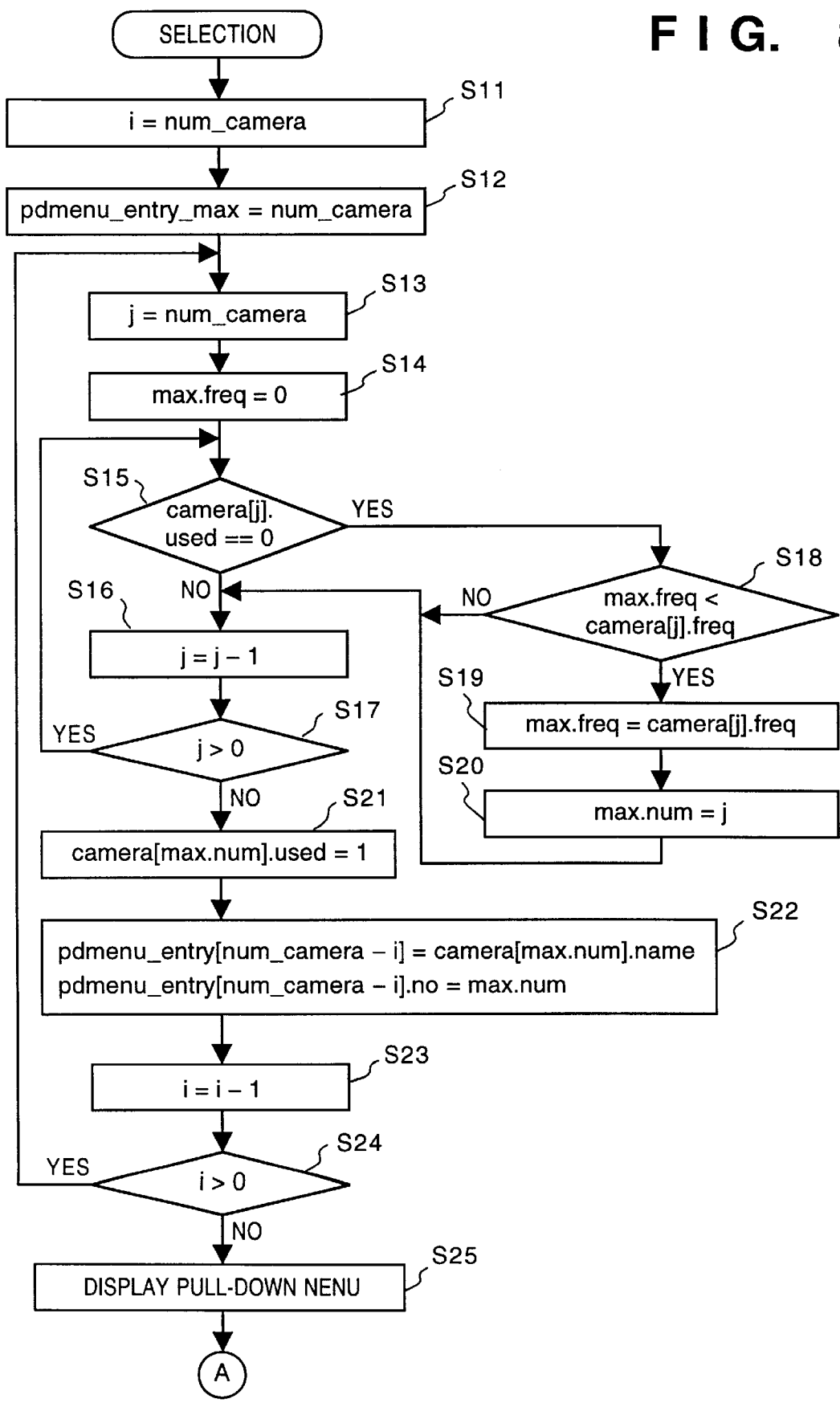
FIG. 8 is part of a flowchart for camera selection.
Figure 9:
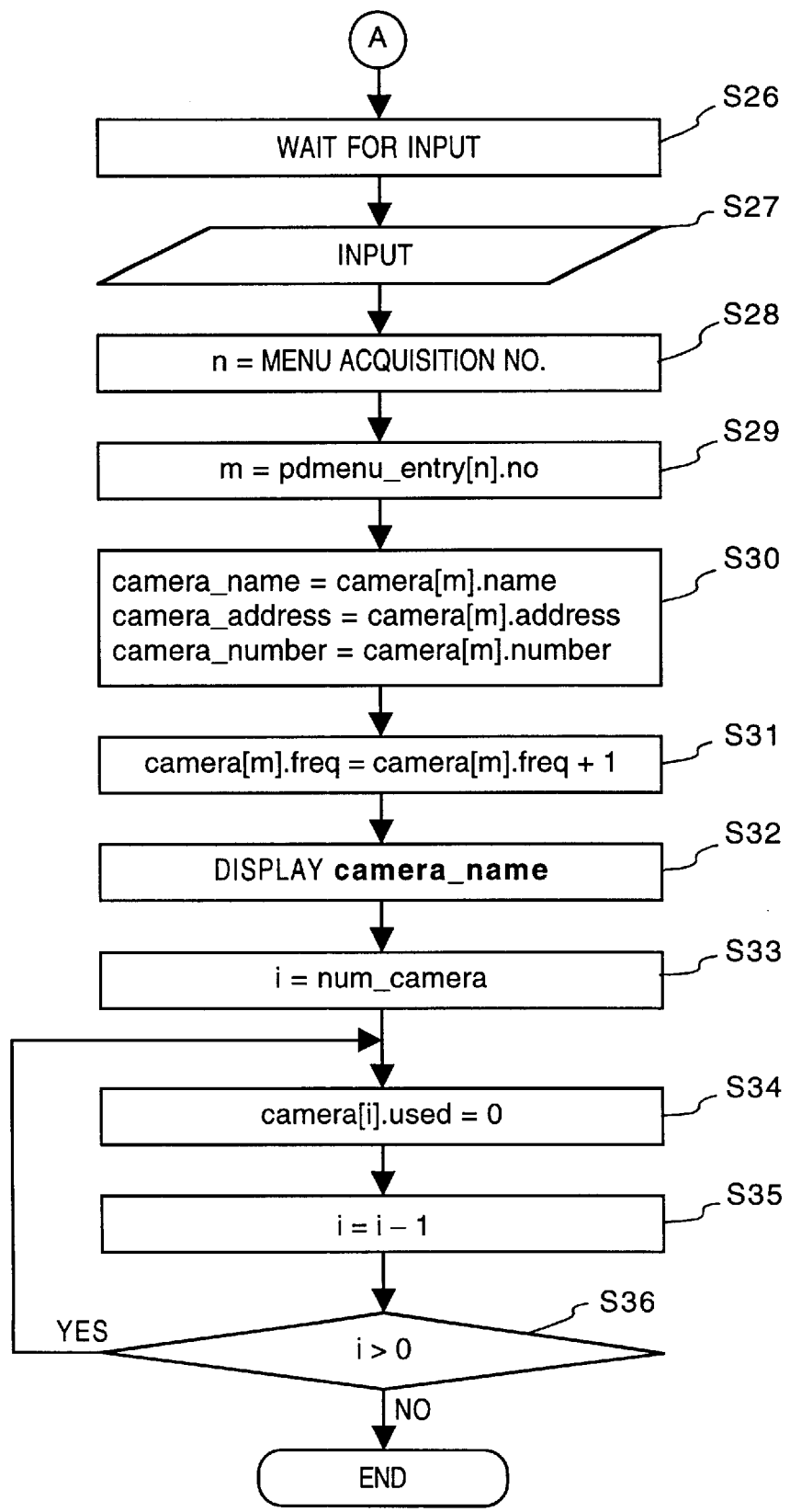
FIG. 9 is part of a flowchart for camera selection.

When the expansion radio button 128 of the camera control interface 60 is clicked on using the mouse, the pull-down menu 130 is displayed in accordance with the flowcharts shown in FIGS. 8 and 9 and the information such as the camera name conforming to the selection made by the user is set in the predetermined variables. Basically, in this embodiment, camera names and registration numbers are substituted into the structure pdmenu_entry[] for the pull-down menu 130 in order of decreasing size of camera[].freq (steps S13~S24). Accordingly, to display the camera list in an order in conformity with the frequency of selection, it will suffice to increment camera[].freq whenever a selection is made (step S31).

First, the value of the variable num_camera is substituted into the loop variable i (step S11). As described earlier, num_camera indicates the number of video cameras registered. The value of num_camera is substituted into the variable pdmenu_entry_max, which indicates the number of camera displayed in the pull-down menu 130.

The value of the variable num_camera is substituted into a local variable j (step S13) and "0" is substituted into the local variable max.freq (step S14). While j is incremented, it is determined whether the variable camera[j].used is "0" (steps S15, S16, S17). When camera[j].used is not "0", this indicates that a value has already been set in the variable pdmenu_entry_max for creating the pull-down menu 130. If camera[j].used is "0" ("YES" at step S15), then camera [j].freq and the variable max.freq are compared (step S18). When camera[j].freq is larger, camera[j].freq is substituted into the variable max.freq (step S19) and the value of the variable j is substituted into the local variable max.num (step S20). The camera having the highest frequency of selection is detected through steps S18, S19 and S20.

When j becomes equal to "0", this means that all registered cameras have been checked. At this point, the number (a serial registration number that starts from 0) indicating the order of registration of the camera for which camera[].freq is maximum, from among the cameras for which camera[]

.used is "0" (i.e., cameras still unregistered in the structure pdmenu_entry for the pull-down menu 130), will have been set in max.num. Next, at step S21, "1" is set in camera [max.num].used. The character string (or pointer) of the variable camera[max.num].name is substituted into the array variable pdmenu_entry[num_camera-i].name and the value of the variable max.num is substituted into the array variable pdmenu_entry[num_camera-i] (step S22). The value of the variable i is decremented (step S23).

The steps from S13 onward are repeated until the variable i becomes "0" (step S24). Thus, camera names and numbers indicating the order of registration thereof can be stored in the array variable pdmenu_entry[] in order of decreasing number of selections, and pdmenu_entry[0].name~pdmenu_entry[num_camera-1].name are displayed in regular order as the pull-down menu 130, as depicted in FIG. 5 (step S25). The camera names are registered in the order Computer 1, Computer 2, Computer 3, Computer 4 and Computer 5, and, in accordance with FIG. 20, the pull-down menu is displayed in this order, as illustrated in FIG. 21. However, according to this embodiment, the camera names are displayed not in the order of registration but, say, in the order Computer 3, Computer 4, Computer 1, Computer 2 and Computer 5, as illustrated in FIG. 4.

At steps S11~S24, results of sorting in order of decreasing frequency of selection are obtained by a double loop. However, it goes without saying that another sorting algorithm can be employed. Since the number of cameras usually is small, it is preferred to make use of an algorithm which will provide results efficiently if the number of controllable cameras is small.

After the pull-down menu 130 is displayed, the apparatus waits for an entry from the user (step S26). When the user makes an entry (step S27), a menu acquisition number is substituted into a local variable n (step S28) and the value of pdmenu_entry[n].no is substituted into a local variable m (step S29). The value of m indicates the registration number of the selected camera name. Next, camera[m].name, camera[m].address and camera[m].number are substituted into global variables camera_name, camera_address and camera_number, respectively, which indicate the present camera to be controlled (step S30).

It should be noted that when a camera is actually remotely controlled, this is performed using the variables camera_name and camera_address_number. Furthermore, camera_name and camera[].name are different. The former is a character string variable which stores the name of the camera designated as the camera to be controlled, while the latter is an array variable (array structure) storing the names of all cameras designated as cameras to be controlled. The same holds true for camera_address, etc.

Since a selection has been made, camera[m].freq is incremented (step S31) and the character string that has been stored in camera_name is displayed in the camera display field 126 (step S32). At this time the pertinent data camera [m].freq of the environment file in the external storage device 30 also is updated.

In order to prepare for the next display of the pull-down menu 130, all of camera[].used are made "0". In other words, the value of num_camera is set in the loop variable i (step S33), "0" is substituted into camera[i].used (step S34) and i is decremented (step S35). Steps S34 and S35 are repeated as long as i is equal to or greater than "1".

In FIG. 8, the camera names are displayed in the pull-down menu 130 in the form of a list in order of decreasing frequency of selection of the video cameras, and the frequency of selection is evaluated as frequency of use. The higher the frequency of selection of a camera, the higher the camera is displayed in the pull-down menu 130. Though not realized with the flowchart shown in FIG. 8, it is preferred that the name of the camera having the highest frequency of selection be displayed in the camera display field 126 of the camera control interface 60 even without the user performing an operation to display the pull-down menu 130. To achieve this, the processing of steps S11~S24 should be executed when the camera control interface 60 is displayed (or prior thereto) or after the selection operation is performed. If this is done, the name of the camera having the highest frequency of selection will be displayed in the camera display field 126 and the user need not display the pull-down menu 130 for the sake of selecting this camera.

Figure 10:
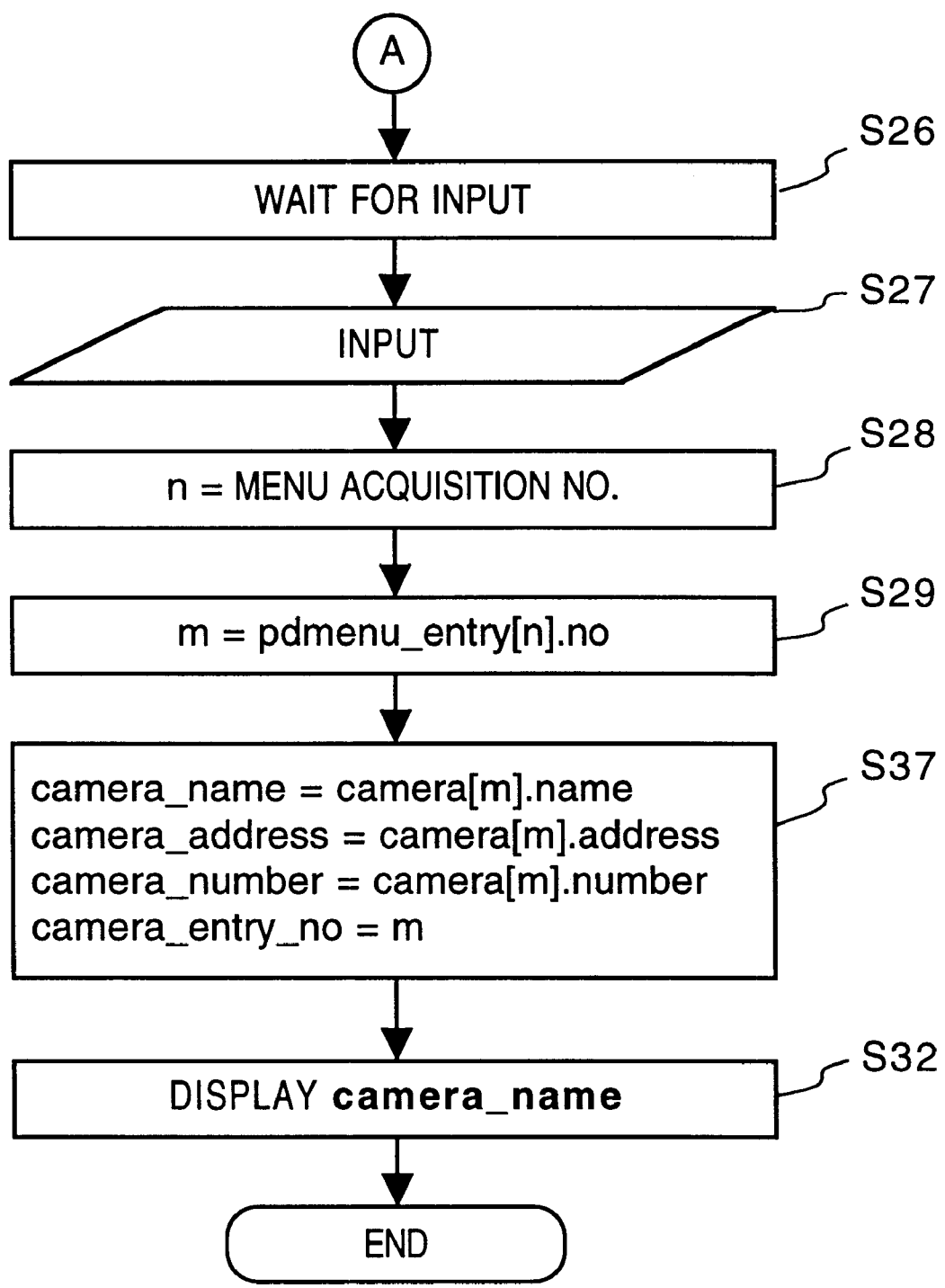
FIG. 10 is a flowchart in which the flowchart of FIG. 9 is modified in such a manner that length of selection time is adopted as frequency of use.
Figure 11:
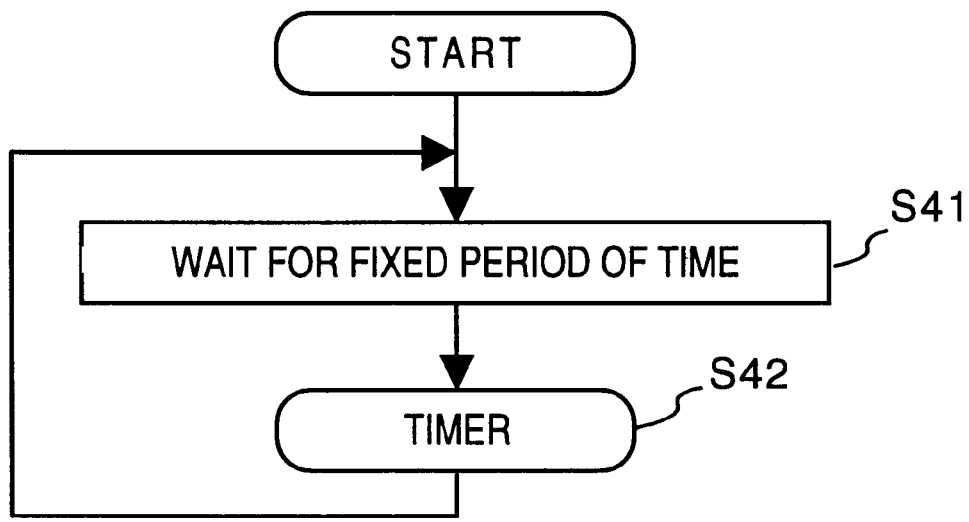
FIG. 11 is a flowchart of a timer start-up routine for counting length of selection time.
Figure 12:
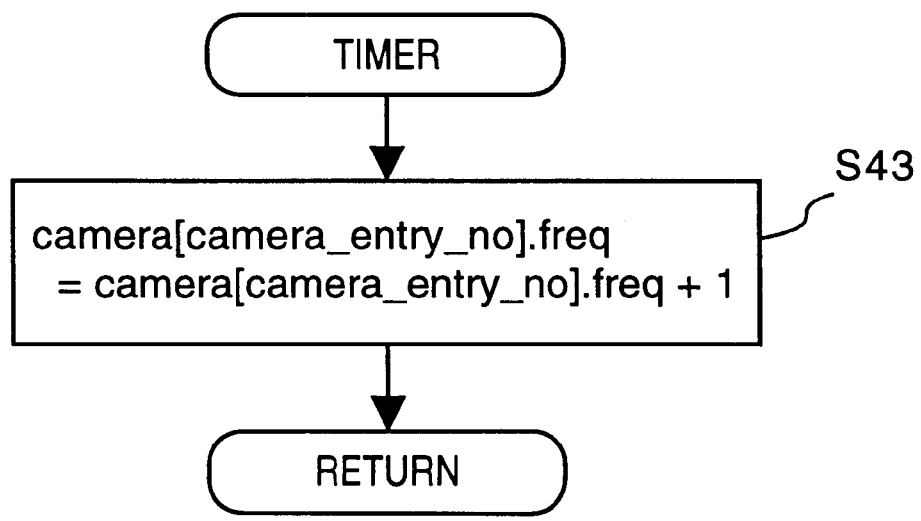
FIG. 12 is a flowchart of a timer routine started at a step S42 in FIG. 11.

A modification of this embodiment will now be described. In the foregoing embodiment, frequency of use is evaluated based upon frequency of use. However, frequency of use may also be evaluated based upon the length of time of the selected state (not the length of time over which video data are received). To this end, the flowchart of FIG. 9 is modified to the flowchart of FIG. 10, and the functions illustrated by the flowcharts of FIGS. 11 and 12 are implemented by the CPU 10. Step S30 in FIG. 9 is modified to step S37 in FIG. 10, step S31 in FIG. 9 is deleted and the processing (steps S33~S36) for clearing camera[].used is deleted. At step S37 in FIG. 10, processing for setting the registration number (variable m) of the camera selected to be controlled in the global variable camera_entry_no is added to the processing of step S30. As shown in FIG. 11, the CPU 10 starts up a timer routine (step S42) at fixed time intervals (step S41). In the timer routine, the value of the array variable camera [camera_entry_no].freq is incremented (step S43), as shown in FIG. 12. Thus, the period of time over which the camera selected for control has been selected is counted and stored in camera[].freq.

As a result, the pull-down menu 130 displays the camera names as a list in order of decreasing time over which the cameras have been selected for control.

Figure 13:
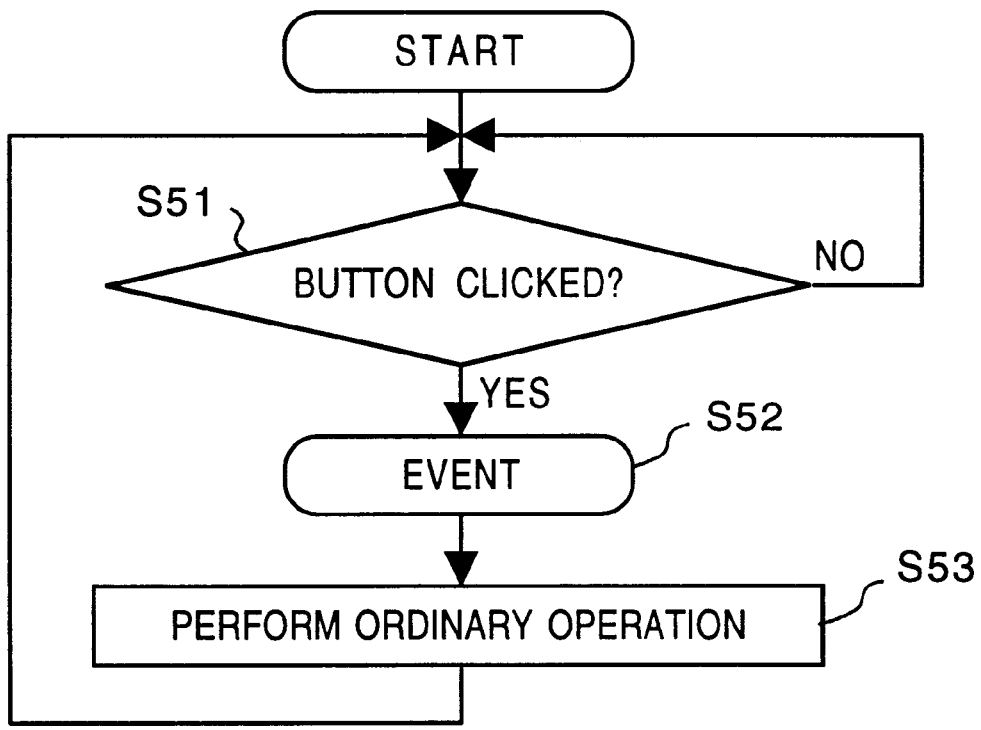
FIG. 13 is a flowchart of a basic routine in an example of a modification in which the number of times a camera control command is issued is adopted as frequency of use.
Figure 14:
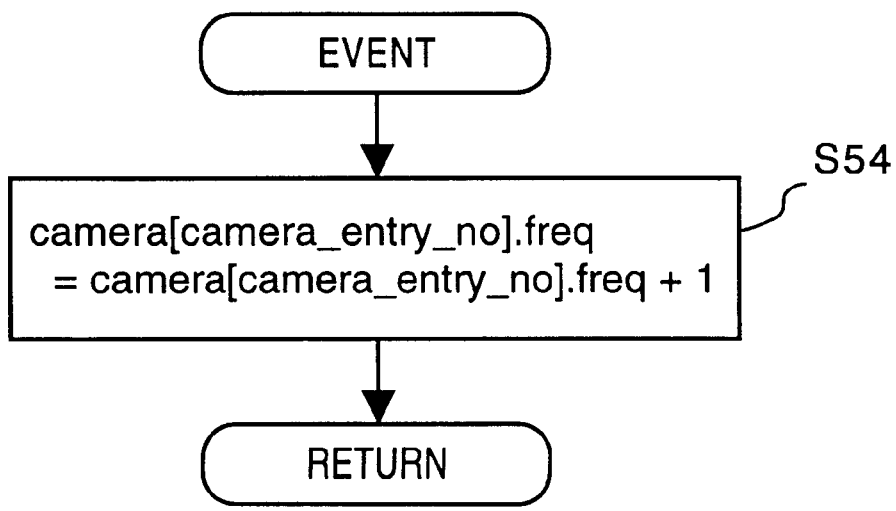
FIG. 14 is a flowchart of a routine started at a step S52 in FIG. 13.

Rather than counting the time over which a camera has been selected for control, the number of times a camera control command is issued may be counted and the pull-down menu 130 may displayed in order of decreasing count value. To achieve this, the CPU 10 should be made to execute the functions of FIGS. 13 and 14 in place of the functions shown in FIGS. 11 and 12. Specifically, it is determined whether any of the camera control radio buttons 112~124 of the camera control interface 60 has been clicked on by the pressing the mouse button (step S51). If any radio button has been clicked on by the mouse ("YES" at step S51), the routine shown in FIG. 14 is called (step S52) and the value of the array variable camera[camera_entry_no].freq is incremented (step S54). Thereafter, the camera control command conforming to the clicked radio button is issued to the video camera having the camera number indicated by the variable camera_number, this being the video camera connected to the communication terminal indicated by the variable camera_address (step S53).

Thus, frequency of use can be evaluated based upon the number of times a camera control command is issued. In other words, the names of the cameras are displayed in the pull-down menu 130 in a list in order of decreasing count of command issuance. This makes it easy to select cameras that are controlled frequently.

Further, an arrangement may be adopted in which the user appropriately selects sorting based upon number of times a connection is made, control time or number of times the camera control command is issued. In such case, the user should be capable of selecting the type of sorting depending upon the situation. To this end, radio buttons corresponding to the types of sorting are provided on the interface 60 shown in FIG. 4. Processing would then be changed over depending upon which of the radio buttons has been clicked on.

Figure 15:
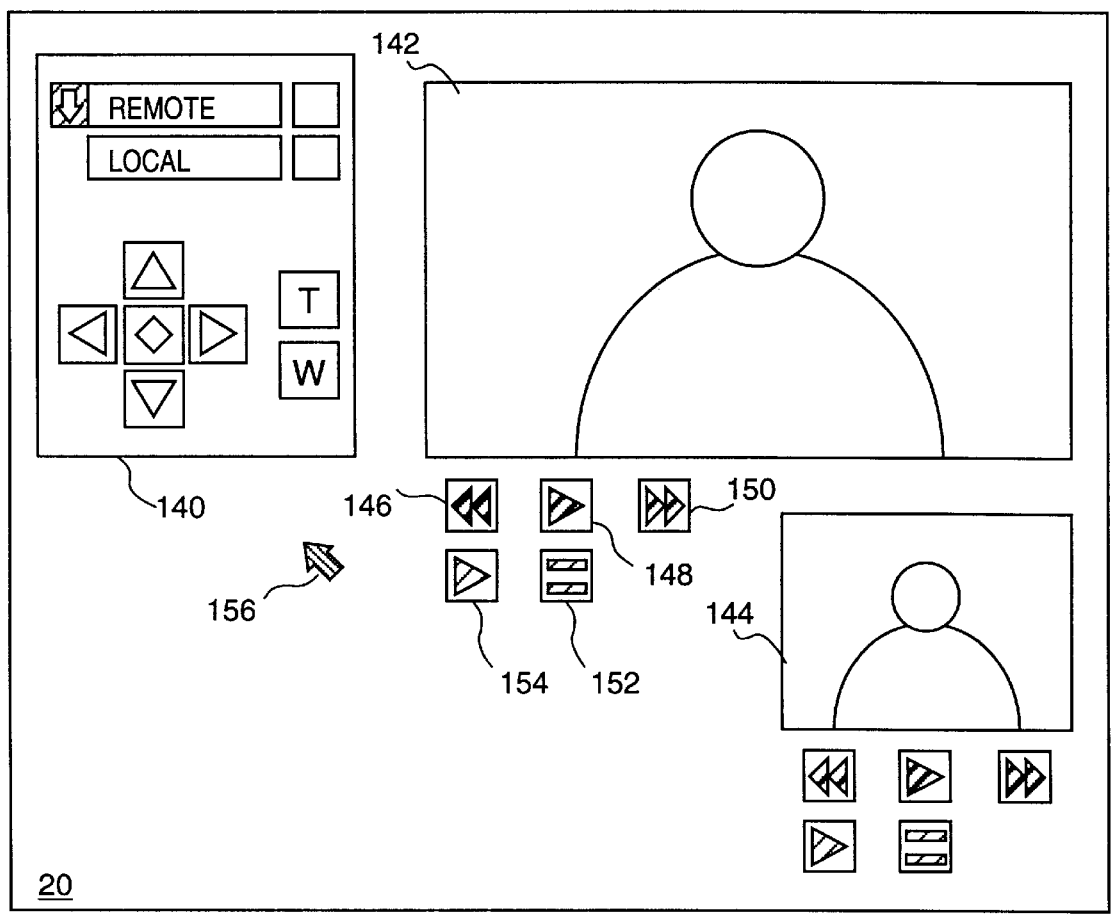
FIG. 15 shows an example of a display screen on a monitor suited to a two-way conference.

Next, a modification limited to a two-way communication conference will be described. FIG. 15 shows an example of the display screen on the monitor 20. Numeral 140 denotes a camera control interface, 142 a video display window for displaying video from the video camera of the other communicating party, and 144 a video display window for displaying video from the video camera connected to the user's own terminal. In a manner similar to that described in conjunction with FIG. 3, radio buttons for playing back recorded video (a rewind button 146, a playback-start button 148, a fast-forward button 150 and a playback-stop button 152) and a changeover button 154 for switching between recorded video and live video are provided. Numeral 156 denotes the mouse cursor.

Figure 16:
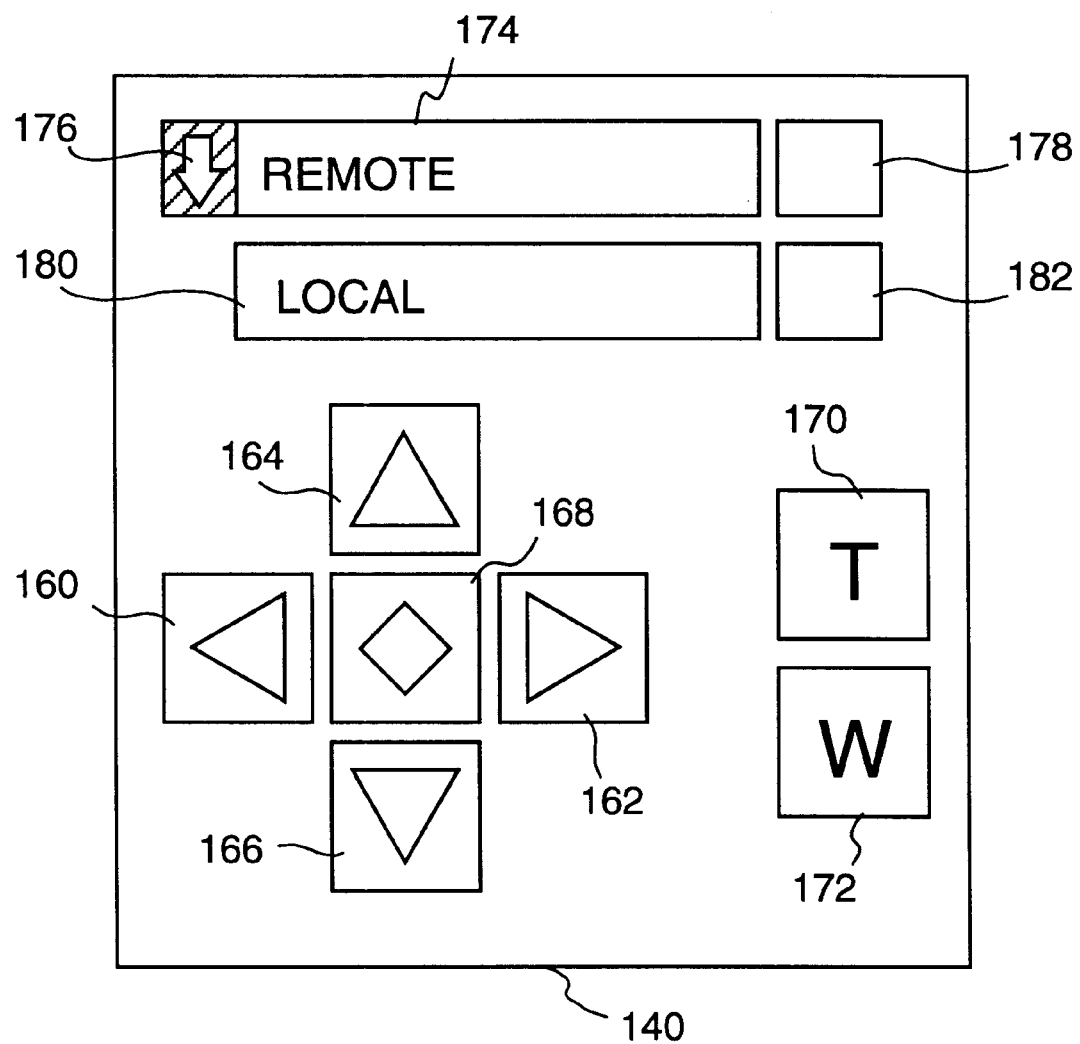
FIG. 16 is a diagram showing the details of a camera control interface.

FIG. 16 illustrates the details of the camera control interface 140. The camera interface 140 has a number of radio buttons for camera control, namely a left-pan button 160, a right-pan button 162, an upward tilt button 164, a downward tilt button 166, a home-position button 168, a telephoto button 170 and a wide-angle button 172. The interface 140 further includes a remote-camera selection radio button 174 clicked on when it is desired to control the camera (referred to as the "remote camera") of the other communicating party, a pull-down radio button 176 for displaying a plurality of video cameras of the communicating party in the form of a pull-down menu, and a registration key 178 for designating registration of a camera name desired to be registered anew as the remote camera. Numeral 180 denotes a local-camera selection radio button 180 clicked on when it is desired to control the video camera (referred to as the "local camera") of the user's own terminal. Numeral 182 denotes a registration radio button for designating registration of a camera name desired to be registered anew as the local camera.

When the user clicks on the registration button 178 by using the mouse, the registration window 334 shown in FIG. 22 is displayed on the monitor screen so that the user can enter a camera name, network address and camera number.

Figure 18:
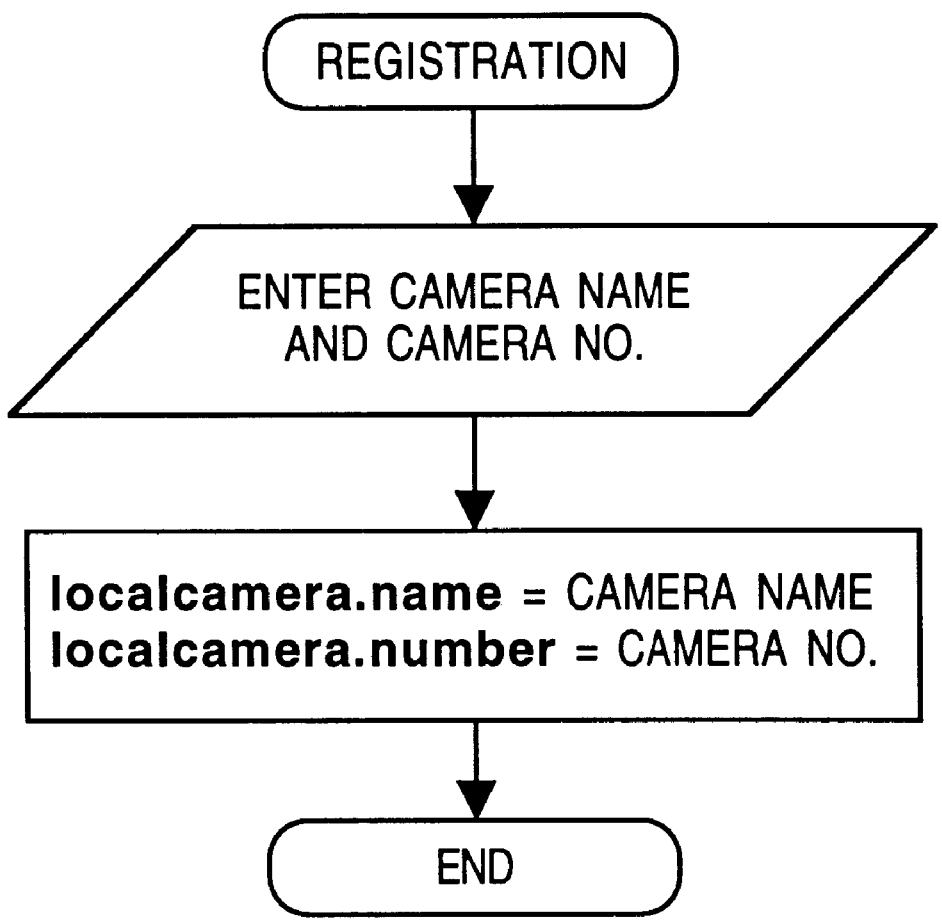
FIG. 18 is a flowchart for registration of remote cameras.

Further, when the user clicks on the registration button 182 using the mouse, the registration window shown in FIG. 17 is displayed on the monitor screen so that the user can set the entered camera name and camera number to prescribed variables in accordance with the flowchart shown in FIG. 18. More specifically, the entered camera name is set in the global variable localcamera.name and the entered camera number is set in the global variable localcamera.number.

Selection of a remote camera will now be described. Basically, operation is performed in accordance with the flowcharts shown in FIGS. 8 and 9. When the cursor associated with the mouse is placed upon the remote-camera selection button 174 and the mouse button is pressed, the remote camera names are displayed in the form of a list by the pull-down menu, in the same manner as shown in FIG. 5, and any camera can be selected. The fact that the selected camera name is not displayed after selection is different from the arrangement of the embodiment described above initially.

Figure 19:
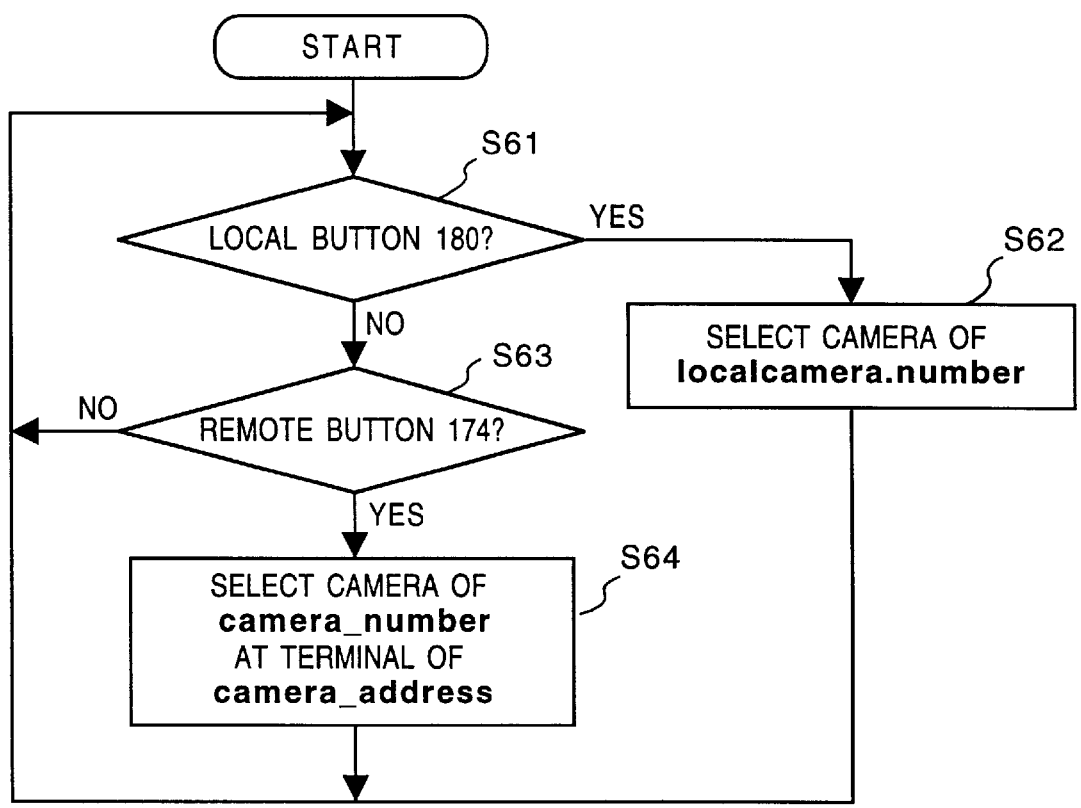
FIG. 19 is a flowchart illustrating camera selection control and the corresponding operation in the camera control interface shown in FIG. 16.

Control for selecting a camera and the corresponding operation will be described with reference to FIG. 19. If either the remote-camera selection button 174 or local-camera selecting button 180 is clicked on by the mouse (step S61 or S63), the program proceeds to step S62 or S74. If the radio button clicked is the local-camera selecting button 180 ("YES" at step S61), the video camera having the camera number indicated by the variable localcamera.number is made the camera to be controlled (step S62). If the radio button clicked is the remote-camera selection button 174 ("YES" at step S63), then the video camera having the video camera number indicated by the variable camera_number is made the camera to be controlled, this video camera being the camera connected to the terminal having the network address indicated by the variable camera_address (step S64).

In this embodiment, the remote-camera selection button 174 for selecting the camera of the other communicating party and the local-camera selecting button 180 for selecting the user's own camera are provided. As a result, changing over the camera to be controlled can be performed quickly and easily. Further, an arrangement may be adopted in which the selection buttons 174, 180 are replaced by a single radio button that performs a toggling operation.

In accordance with the embodiment described above, when a list of cameras to be controlled is displayed, the camera names can be displayed upon being sorted in order of decreasing frequency of use.

The information which is the reference for sorting is based upon the frequency of use and the content of the environment file stored in the external storage device 30 provided in each terminal. Accordingly, there is no assurance that power is being supplied to the communication terminal possessing the camera having the highest frequency of use or that an operator is present at this communication terminal.

Accordingly, and by way of example, when a camera name selected by default in FIG. 4 or a list of camera names displayed in the pull-down menu of FIG. 5 is displayed, it is determined at this time whether the communication terminal is one being supplied with power. If the communication terminal is one whose power supply is OFF, the relevant camera name is not displayed in the list even if the camera has a high frequency of use or the camera name is displayed in such a manner that the user can distinguish the camera from one whose power supply is ON. If this expedient is adopted, it is possible to avoid a situation in which a camera is controlled regardless of the fact that it is not being supplied with power.

Further, it is possible to adopt an arrangement in which, when power is capable of being introduced to a certain terminal remotely, power is introduced to this terminal and its camera automatically if the camera has been selected.

It is necessary to take the question of privacy into consideration in a situation where a camera is capable of being remotely controlled at will. In such case, an expedient that may be adopted on the side of each terminal is to preset the terminal so as to be capable of enabling or disabling remote control and to control the camera remotely only when acceptance of such control has been set. Of course, if the setting is to disable remote control, it is preferred that this be distinguishable by the user when the list of cameras to be controlled is displayed.

Further, in FIG. 3, the four video display windows 62, 64, 66 and 68, one of which is for displaying the video from the user's own terminal, are displayed on the screen. Accordingly, an arrangement may be adopted in which, when the list of camera names in the pull-down menu in camera control interface 60 is displayed, the camera name corresponding to any one of the video display windows 62, 64, 66 and 68 is made distinguishable, as by being displayed in a color different from that of the other camera names. As a result, at least a camera name corresponding to a video display window in which video is currently being displayed can be distinguished in a simple manner.

Further, in order to make it easy to distinguish which video display window is that for a camera name that has been selected in the pull-down menu, it is so arranged that if the selected camera name is in a video display window currently presenting a display, this video display window will be displayed in a manner to distinguish it from the other video display windows. For example, the color of the outer frame of the video display window corresponding to the selected camera name can be made different from the colors of the outer frames of the video display windows corresponding to the unselected camera names. By adopting this expedient, the corresponding relationship between cameras to be controlled and the video display windows is clarified. If a camera is selected unintentionally, the user will be able to notice the error with ease.

In accordance with the foregoing embodiment, any camera can be controlled in a simple manner by remote control when an electronic conferencing system has been constructed. However, it goes without saying that a situation may arise in which, when it is attempted to remotely control the camera whose camera name is "Computer 1", another user (inclusive of the user of Computer 1) may be attempting to control the camera of "Computer 1" at the same time. (Though each user does not necessarily assign the same names to the cameras of each of the terminals, it will be assumed here that the names are the same.)

In this case, a camera control command is issued to the same IP address from the terminal of each user. Here each terminal sets and registers the order of priority of control of its own camera. In this case, control of the user's own camera is given the highest priority, and the user is free to set and register the priorities of control of the cameras from the second onward. Though the details will be described later, an arrangement may be adopted (as in an embodiment described below) in which it is determined via a control channel whether a camera to be controlled is already being controlled by another terminal, and a control channel is connected to allow panning, tilting and zooming of the camera only if it is not already under control.

In order to execute the above embodiment without difficulty, the following point should be taken into consideration:

Specifically, in a camera control system in which a plurality of cameras having a pan/tilt function and/or a zoom function are placed at respective locations, the cameras are connected via communication lines to a controller at a center or some other location and any camera is capable of being remotely controlled, a control-signal line for transmitting camera control/status signals is required in addition to the cables which transmit the video/audio signals.

Though a method of modulating a camera control/status signal and superposing the signal on a video/audio signal is known, logically this is the same as providing separate communication channels.

A camera control system for remotely controlling any camera upon establishing a communication channel for video/audio and control signals when necessary is employed in video conferencing implemented on a computer network such as a LAN (local area network). In a video conferencing system, video/audio entered at each terminal and various control information can be transmitted among terminals using the same network and the camera of any party can be remotely controlled.

A camera control system in which special-purpose cables for video/audio are laid is effective in a case where the number of cameras to be remotely controlled is small, a case where location of installation is seldom changed and a case where remote control is effected from a fixed location. However, convenience diminishes when any of these requirements is not satisfied. Laying the video/audio cables requires great expenditure and changing the location of installation is very troublesome. For example, the re-laying of a video/audio cable attendant upon the change in the location of a camera is very troublesome and is not feasible under certain circumstances. If there are n-number of cameras and m-number of controllers which remotely control these cameras, then N×M video/audio cables must be laid.

Further, in a video conferencing system, the cameras capable of being remotely controlled are the small number of cameras connected to the terminals of the participants in the conference. This does not satisfy the requirement that video (and audio) from a camera at any location been seen and heard freely when desired.

Accordingly, there is need of a camera control system through which a plurality of cameras can be remotely controlled freely from any of a plurality of control means.

Further, there is need of a camera control system through which a plurality of cameras and one or more control means can be interconnected via a data network and any camera can be remotely controlled from any of the one or more control means.

Such a camera control system will now be described. In the foregoing embodiment, the arrangement shown in FIG. 1 has been described as the communication terminal shown in FIG. 2. However, the description that follows will be rendered using the arrangement of FIG. 23 for the sake of convenience. Furthermore, it will readily be appreciated that the arrangement of FIG. 23 is correlated with that shown in FIG. 1.

The general feature of the embodiment described below is that a plurality of cameras are connected to a LAN or the like, any camera is remotely controlled from a computer connected to the same LAN and the video from any camera is capable of being acquired. It should be noted that unless stated otherwise, "connect, disconnect" in the description below refers to a channel for camera control; it does not refer to a video/audio cable from a camera.

This embodiment of the invention will now be described in detail with reference to the drawings from FIG. 23 onward. For the sake of description, the foregoing embodiment shall be referred to as the first embodiment, and the embodiment described below shall be referred to as the second embodiment.

Figure 23:
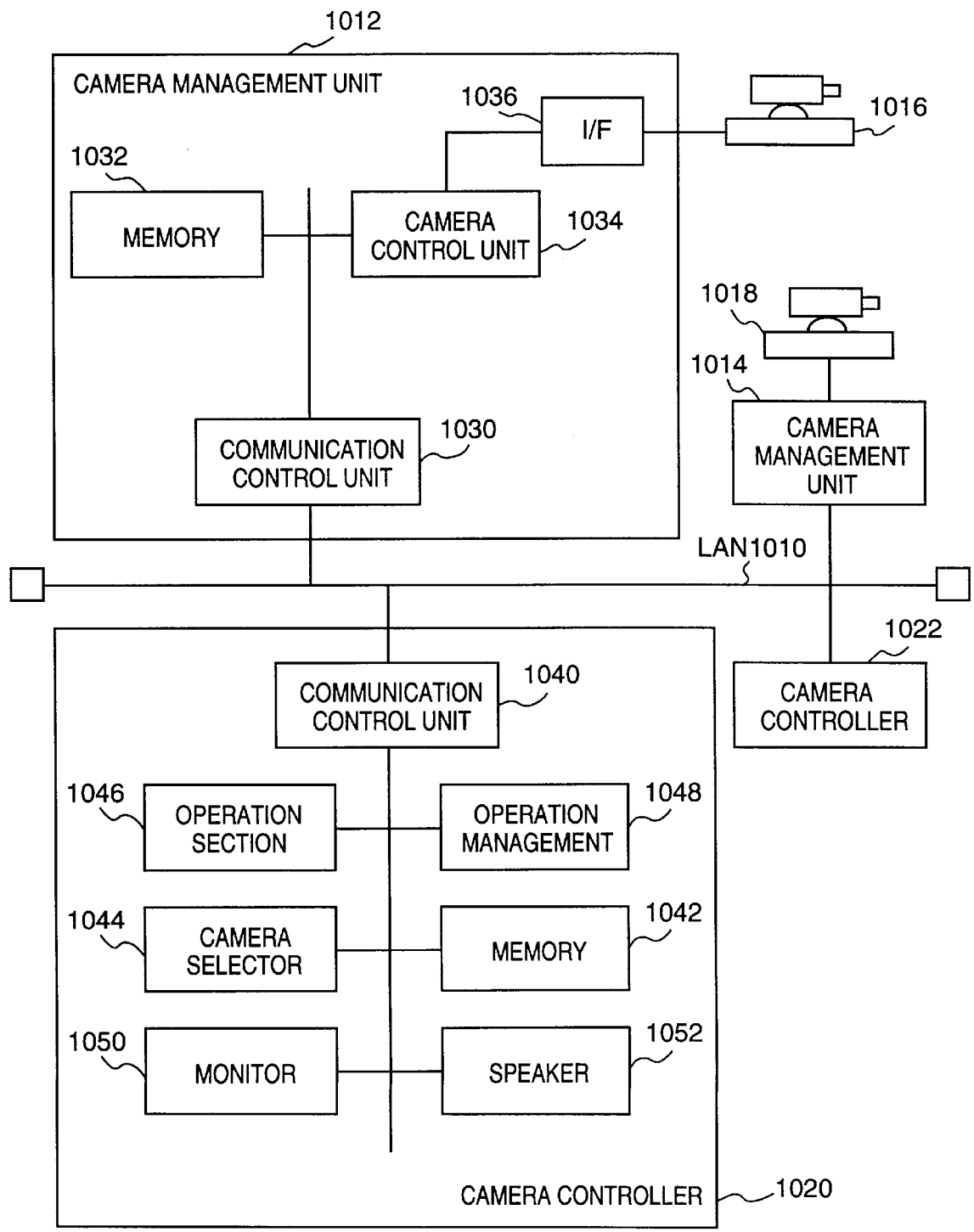
FIG. 23 is a block diagram schematically showing a second embodiment of the present invention.

FIG. 23 is a block diagram showing the general construction of the second embodiment.

As shown in FIG. 23, a LAN 1010 comprising an Ethernet has a plurality of camera management units 1012, 1014 connected thereto. Video cameras 1016, 1018 are connected to the camera management units 1012, 1014. Each of the video cameras 1016, 1018 has a microphone for audio input. Also connected to the LAN 1010 are a plurality of camera controllers 1020, 1022 for remotely controlling the video cameras 1016, 1018.

Though the details will be described later, the camera management units 1012, 1014 control the orientation (panning/tilting) and zooming of the video cameras 1016, 1018 under management in accordance with camera control signals from the camera controllers 1020, 1022, and transfer video (and audio) to the source of the control signals.

The camera management unit 1012 comprises a communication control unit 1030 for controlling the connection and data communication with either of the camera controllers 1020, 1022 via the LAN 1010, a memory device 1032 for storing various data inclusive of video/audio data to be transferred, a camera control unit 1034 for controlling orientation and magnification of the video camera 1016 and supplying video/audio data from the camera 1026 to the communication control unit 1030 via the memory device 1032, and an interface 1036 for connecting the video camera 1016 to the camera control unit 1034. The camera management unit 1014 has a construction identical with that of the camera management unit 1012.

The camera controller 1020 comprises a communication control unit 1040 for controlling the connection and data communication with either of the camera management units 1012, 1014 via the LAN 1010, a memory device 1032 for storing various data inclusive of video/audio data to be transferred, camera selecting means 1044 for selecting a camera to be controlled, operation means 1046 for controlling the panning, tilting and zooming of one camera selected by the camera selecting means 1044, operation management means 1048 for managing selection by the camera selecting means 1044 and control by the operation means 1046 and for effecting an exchange of information for control with the camera management unit that controls the camera to be controlled, a display monitor 1050 for displaying received video, and a speaker 1052 for outputting received audio.

Each of the camera controllers 1020, 1022 essentially comprises a personal computer or a work station. The section composed of camera selecting means 1044, operation means 1046 and operation management means 1048 is implemented by the computer or work station, specifically image elements or a selection menu or the like set on a graphical user interface, a pointing device such as a mouse for operating or selecting the image elements or selection menu, and program software for displaying the graphical user interface and implementing the operation of the pointing devices or the selection operation.

Though two camera management units 1012, 1014 and two camera controllers 1020, 1022 are illustrated in FIG. 23, it should be obvious that three or more camera management units can be connected to the LAN 1010 as well as three or more camera controllers.

Figure 24:
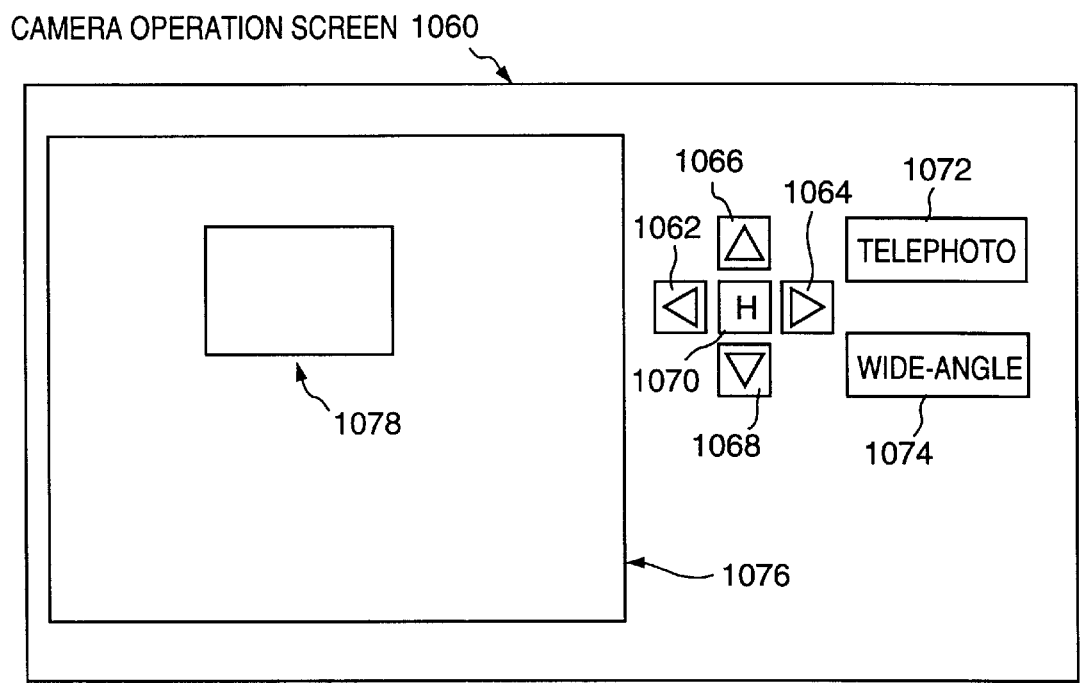
FIG. 24 shows an example of a camera operation screen.

FIG. 24 shows an example of a camera operation screen represented by the operation means 1046 in FIG. 23. The camera operation screen, indicated at 1060, is displayed on the monitor 1050. The camera operation screen 1060 is provided with control radio buttons, namely pan radio buttons 1062, 1064 which designate rotation in the horizontal direction, tilt radio buttons 1066, 1068 which designate rotation up and down, a home radio button 1070 for return to the home or front position, a telephoto radio button 1072 which designates zooming in for telephoto and a wide-angle radio button 1074 which designates zooming out for wide angle. A rectangular frame 1076 indicates the largest possible area of photography obtained by maximizing the angle of view of the camera under control and panning and tilting the camera to the maximum extent. A rectangular frame 1078 indicates the present area of photography, which is based upon the present prevailing panning angle, tilt angle and zoom value, at a relative position within the frame 1076.

Figure 25:
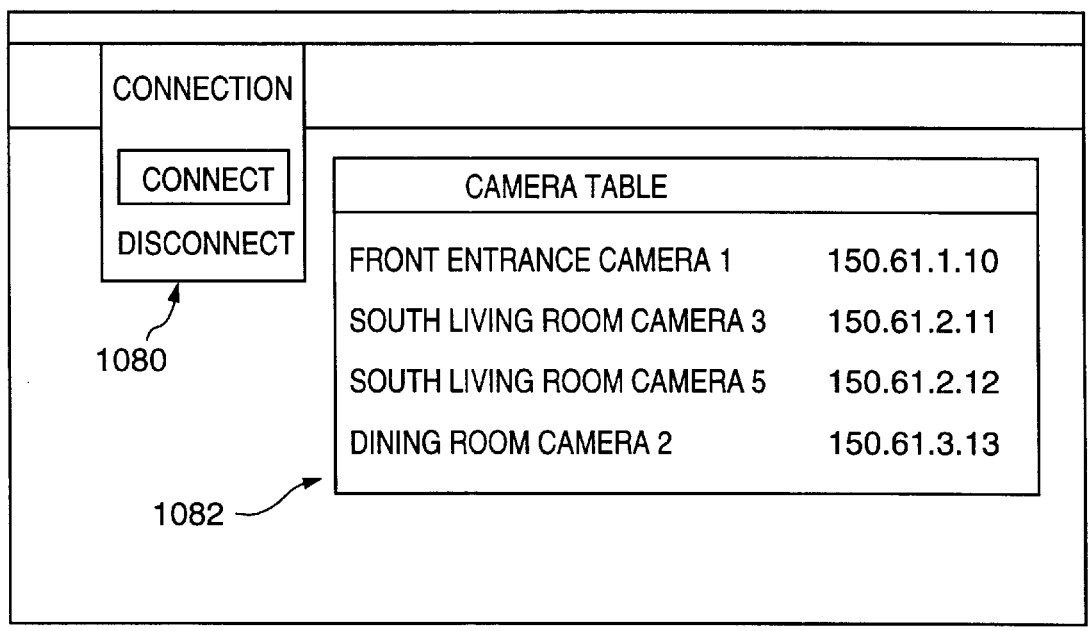
FIG. 25 shows an example of a camera table and a connect/disconnect menu.

FIG. 25 illustrates a camera selection screen, represented by the camera selecting means 1044 in FIG. 23, for selecting the camera to be controlled. The camera selection screen also is displayed on the monitor 1050. A "CONNECTION" pull-down menu 1080 has connect and disconnect items. With display of the pull-down menu 1080 by selection of the "CONNECT" menu, or in response to selection of a display menu (not shown) of a camera list, a camera table 1082 indicating a list of all selectable cameras is displayed. It should be noted that the camera list display on the camera selecting means 1044 is sorted in order of frequency of use in the manner described in the first embodiment.

The camera table 1082 is composed of sets of names and identification information. The names indicate individual cameras in easily understandable form, and the identification information uniquely identify the camera management units 1012, 1014 of the connected parties. Since the camera management units 1012, 1014 and camera controllers 1020, 1022 are connected via the LAN 1010 in this embodiment, IP addresses are adopted as the identification information. The camera names and the IP addresses of the camera management units thereof are stored in the storage device 1042.

If "CONNECT" in the "CONNECTION" pull-down menu 1080 is selected with any camera displayed in the camera table 1082 having been selected, this camera is rendered controllable via the LAN 1010 and the video from this camera is displayed in a video display window (not shown) on the monitor 1050. For example, see FIG. 3 of the first embodiment.

If "DISCONNECT" in the "CONNECTION" pull-down menu 1080 is selected with any already connected camera having been selected from among the cameras displayed in the camera table 1082, the privilege to control this camera is given to another camera controller and the video from the camera vanishes from the monitor 1050.

Figure 26:
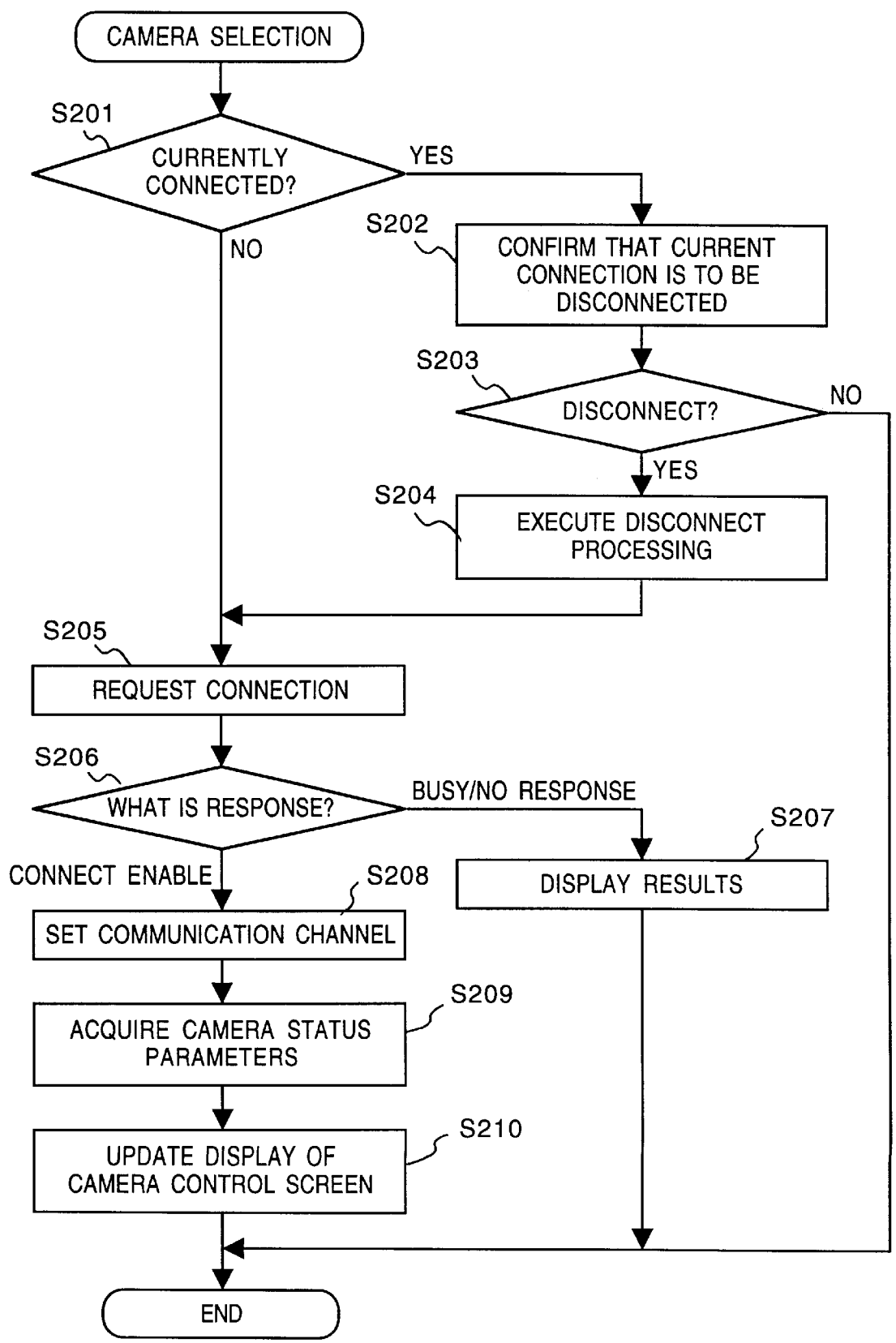
FIG. 26 is a flowchart showing the operation of a camera controller when a camera is selected.
Figure 27:
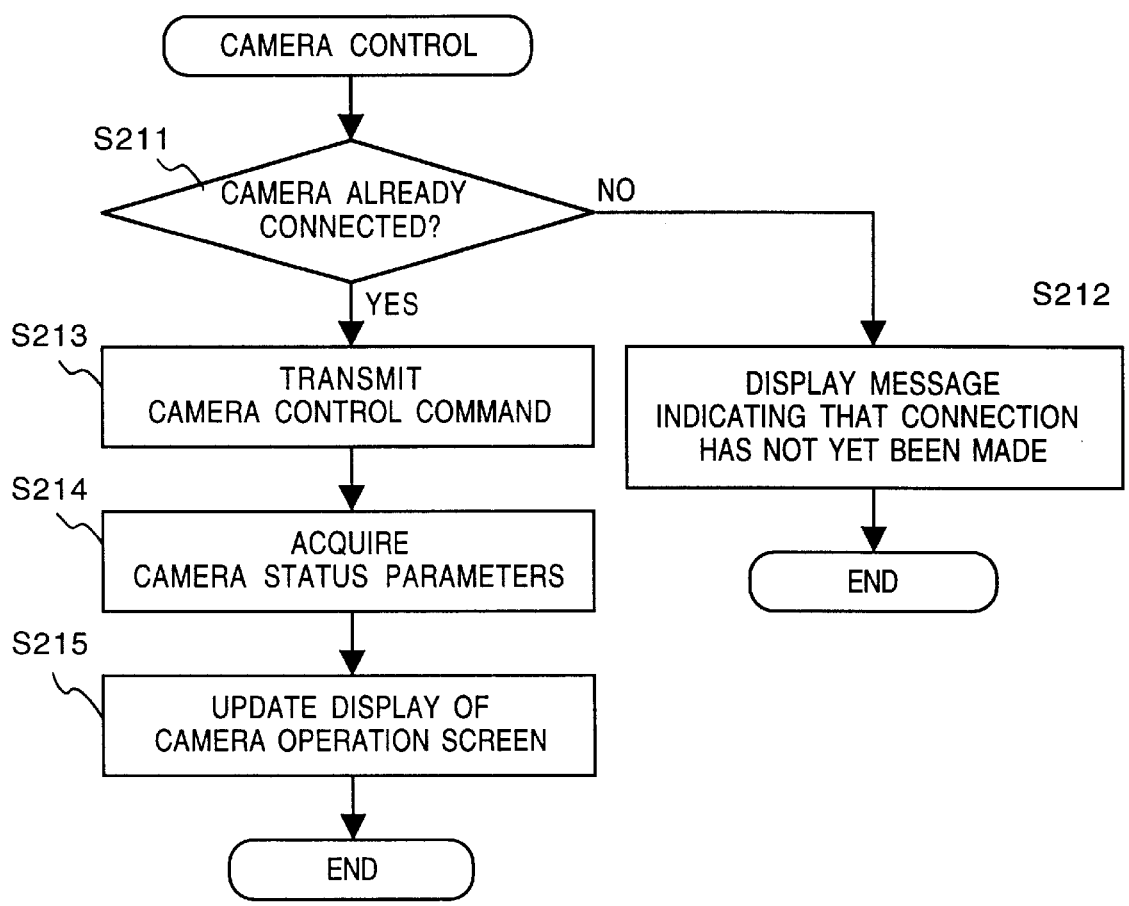
FIG. 27 is a flowchart showing the operation of the camera controller when a camera is controlled.
Figure 28:
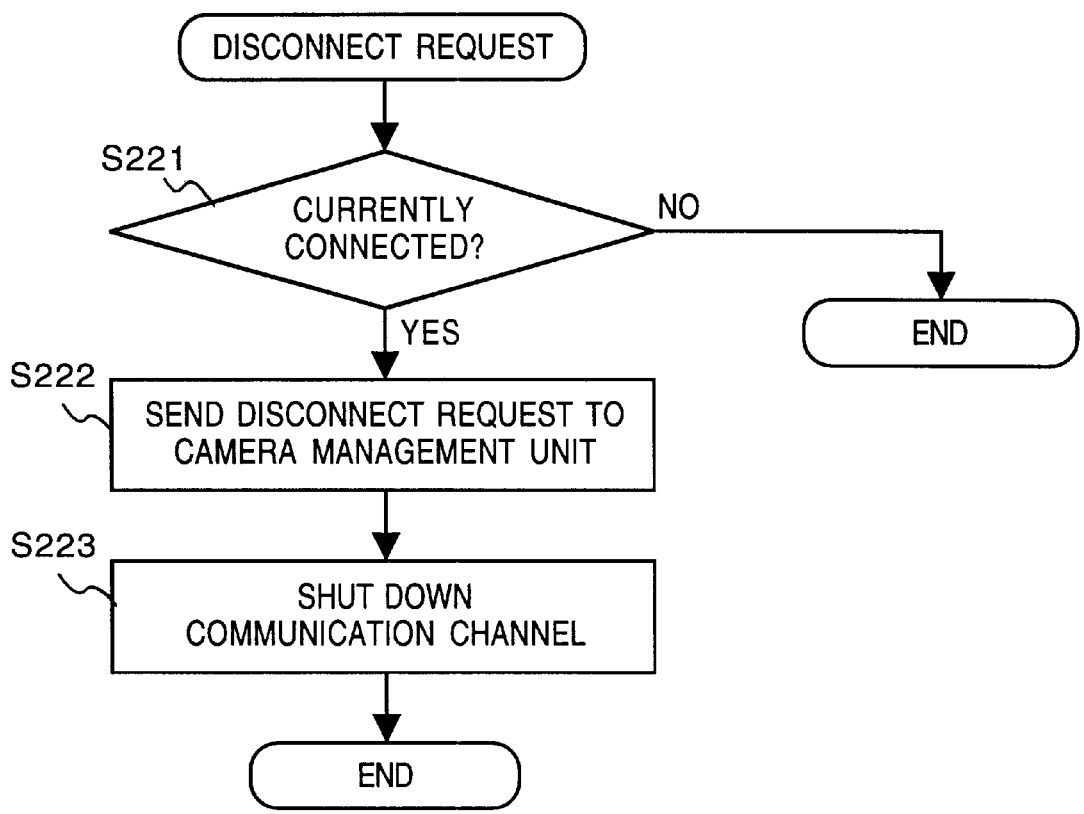
FIG. 28 is a flowchart showing the operation of the camera controller when a camera is disconnected.

The operation of the second embodiment will now be described with reference to the flowcharts shown in FIGS. 26 through 32. FIGS. 26 through 28 are flowcharts of the operation performed by the camera controllers 1020, 1022, and FIGS. 29 through 32 are flowcharts of the operation performed by the camera management units 1012, 1014.

FIG. 26 is a flowchart showing operation performed when a camera is selected. It will be assumed here that the operator will use the camera controller 1020. When the operator selects a connectable camera by the camera selecting means 1044, the operation management means 1048 determines whether the camera controller 1020 is presently connected to another camera (i.e., whether the camera controller 1020 is currently exercising control) (step S201). If the camera controller 1020 is connected ("YES" at step S201), then the operator confirms whether it is permissible to disconnect this connection (step S202). If the operator makes an entry to the effect that disconnection is not to be performed ("NO" at step S202), then processing ends as is. If the operator enters a disconnect command, on the other hand, the operation management means 1048 instructs the communication control unit 1040 to disconnect the communication path to the camera that is currently connected (step S204). More specifically, the disconnect processing executed by the communication control unit 1040 entails giving notification of disconnect to the communication control unit of the other communicating party and then releasing or shutting down the logical communication channel.

As described earlier, "disconnection" mentioned here refers to the channel for camera control and not to the channel for transferring video sent from a camera. Accordingly, the fact that the camera control channel is disconnected does not mean that the video from the camera is interrupted. In other words, camera control such as panning, tilting and zooming means placing another controller in a state in which it is capable of being used. The result is that control channels need no longer be provided in a number equivalent to the number of cameras.

In a case where the camera controller 1020 is not connected to a camera other than a selected camera ("NO" at step S201), or in a case where the camera controller 1020 has been disconnected from another camera (step S204), a request to effect connection to a selected camera is sent to the camera management unit managing the selected camera (step 205) and then a response is awaited (step S206). Here it will be assumed that the connection request is for connection to the camera 1016 managed by the camera management unit 1012. Upon receiving the connection request, the communication control unit 1030 of the camera management unit 1012 determines whether the designated camera is already being controlled by another camera controller. The camera management unit 1012 sends back a busy signal if the camera is being controlled by another camera controller and sends back a connect enable signal if the camera is not being controlled by another camera controller.

If the response from the camera management unit 1012 that was sent the connection request is a busy signal, or if there is no response from the unit 1012 within a fixed period of time, then the camera controller 1020 judges that the connection failed and presents a display to this effect (step S207), after which processing ends. On the other hand, if a connect enable response is received from the camera management unit 1012 (step S206), then the communication control unit 1040 establishes a logical communication channel (step S208), requests the camera management unit 1012 for the status parameters of the camera to be controlled and then acquires the parameters (step S209). Using the status parameter acquired, the operation management means 1048 displays the camera operation screen 1060 (step S210). This is for correctly positioning the orientation (panning/tilting) of the camera to be controlled and the frame 1078, which indicates the present status of zooming, within the frame 1076 of the photographable area. It should be noted that the information indicating the photographable area of the camera to be controlled is connected from each camera in advance.

FIG. 27 is a flowchart showing operation when a camera is controlled. If the operator clicks on any of the control radio buttons 1062~1074 of the camera control interface 1060, the operation management means 1048 determines whether any camera has been connected (step S211). If a connection has not yet been made ("NO" at step S211), a display to this effect is presented and processing ends (step S212). If a connection has already been made ("YES" at step S211), the camera control command corresponding to the clicked button is sent to the currently connected camera management unit via the established communication channel (step S213). The status parameters of the controlled camera after the operation thereof are acquired from the connected camera management unit (step S214) and the frame 1078 of photographic area on the camera operation screen 1060 is updated (step S215).

When, as a result of the foregoing, a zoom, tilt or zoom command, for example, is sent to the camera management unit of the camera under control via the control channel, the camera management unit responds to the command by controlling the camera and sending back, to the camera controller, the camera status information resulting from control. The result of this operation is a change in the position and size of the rectangular frame (the area currently covered by photography) 1078 inside the frame 1076, which indicates the area capable of being covered by the camera, on the camera operation screen 1060.

FIG. 28 is a flowchart of operation at disconnect. When the operator selects "DISCONNECT" from the camera connect/disconnect screen shown in FIG. 25, the operation management means 1048 determines whether any camera or camera management unit is currently connected (step S221). If a connection exists ("YES" at step S221), a disconnect request is sent to the communication controller of the other party's camera management unit (step S222) and the established logical communication channel is released or shut down (step S223). If a connection is not in effect ("NO" at step S221), a display to this effect is presented and processing is terminated.

Figure 29:
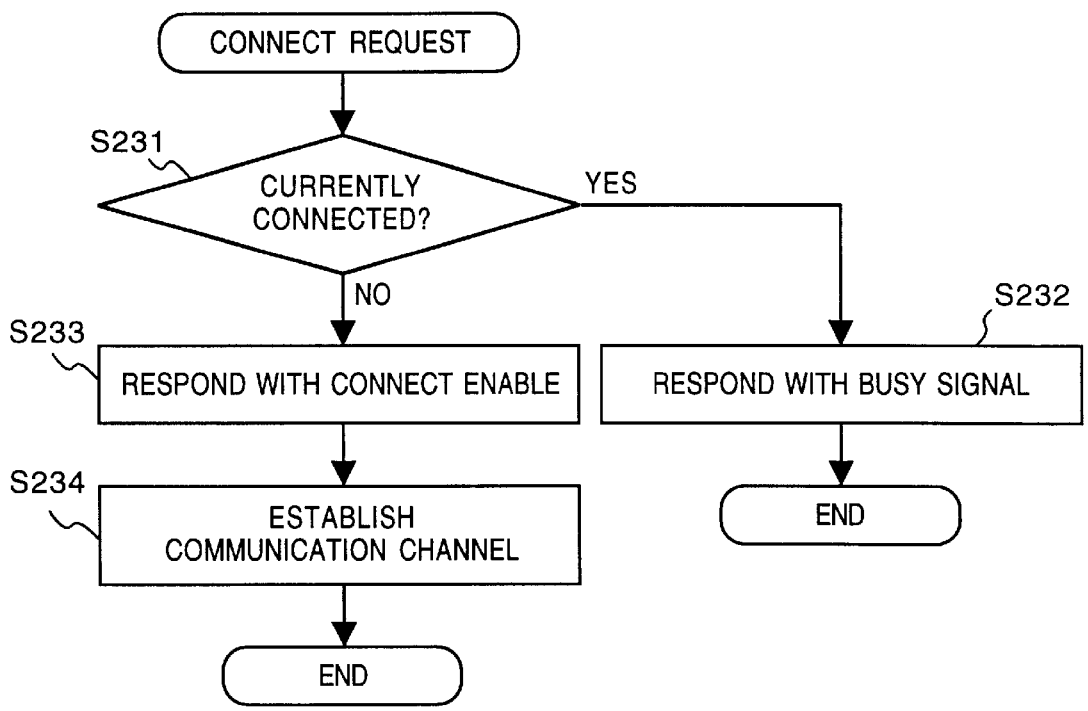
FIG. 29 is a flowchart showing the operation of a camera management unit in response to a connection request from the camera controller.

FIG. 29 is a flowchart showing the operation of a camera management unit (e.g., unit 1012) when a connect request has been received from a camera controller (e.g., controller 1020). When there is a connect request from a camera controller on the LAN 1010, the camera controller 1020 determines whether a connection is in effect (step S231). If a connection is in effect ("YES" at step 231), a busy signal is sent back and processing is terminated (step S232). If connection is possible ("NO" at step S231), then a connect enable response is issued (step S233) and a logical communication channel to the communication control unit 1030 is established (step S234).

Figure 30:
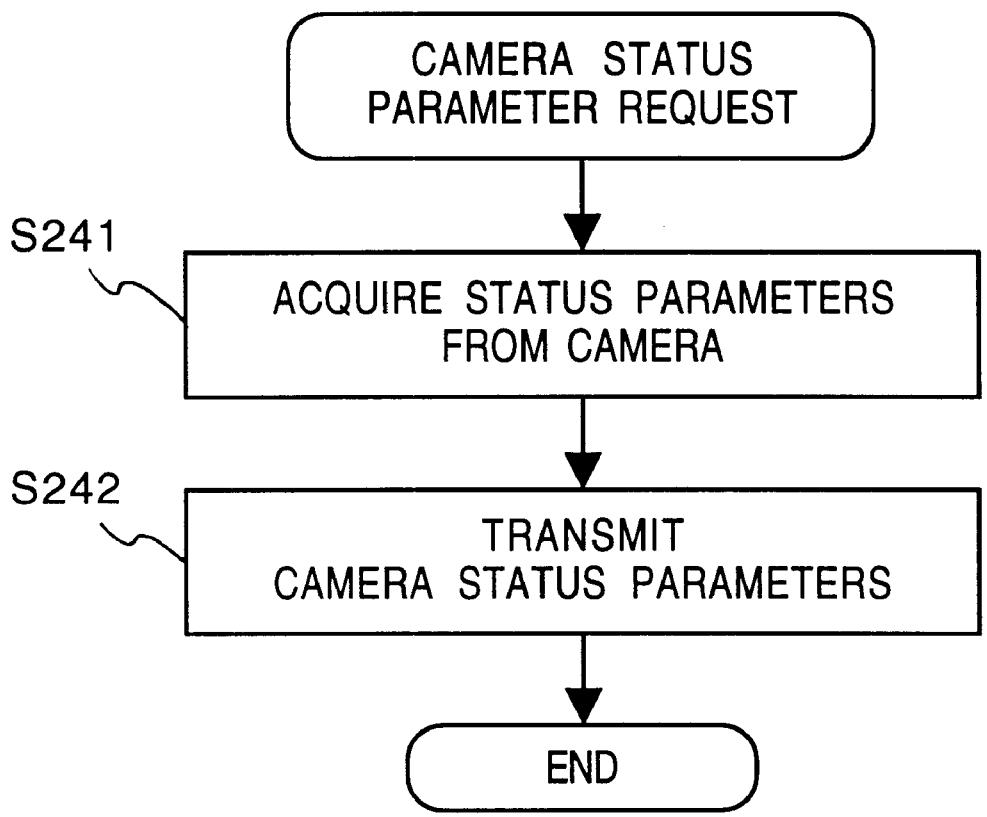
FIG. 30 is a flowchart showing the operation of the camera management unit in response to a camera-status parameter request.

FIG. 30 is a flowchart showing the operation of the camera management unit in response to a camera-status parameter request. When camera status parameters are requested by a camera controller, the camera control unit 1034 sends a status-parameter request command to the camera 1016 via the camera interface 1036, acquires the present values (S241) and sends the acquired present values back to the camera controller that requested the status parameters (step S242).

At the time of the initial connection, it is necessary to acquire and transmit all of the parameters. After a pan/tilt or zoom operation has been performed, however, it is effective to acquire only parameters that have been changed and transmit these parameters. Further, in a case where the camera controller of a connected party is changed over after camera status has been acquired, the parameters acquired immediately before will still be valid. Hence, these parameters may be stored in the memory device 1032 to replace the values stored there without acquiring the status parameters from the camera 1016.

Figure 31:
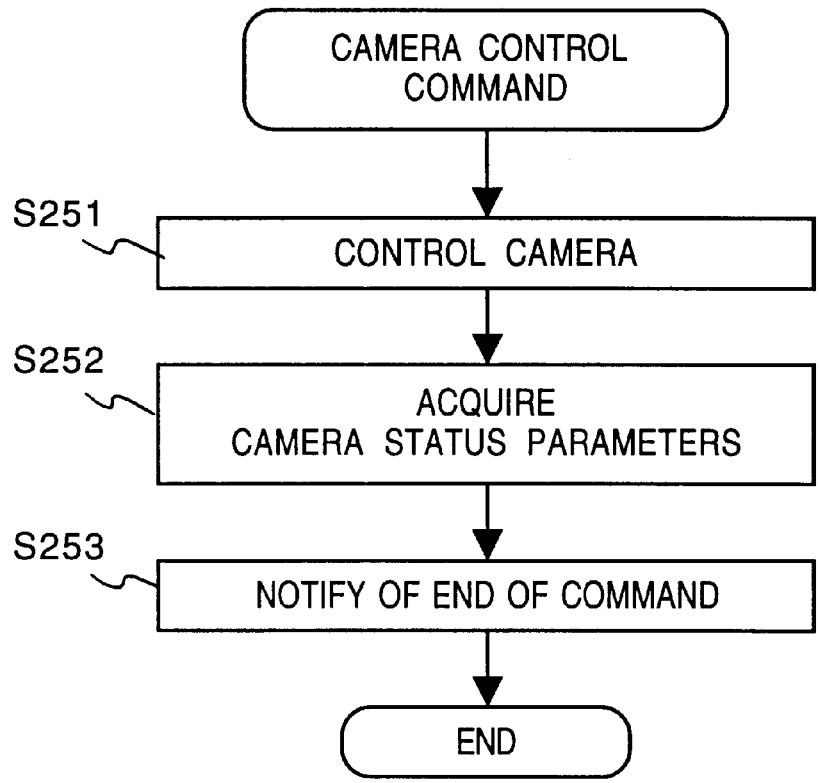
FIG. 31 is a flowchart showing the operation of the camera management unit in response to a camera control command.

FIG. 31 is a flowchart showing the operation of the camera management unit in response to a camera control command. If a camera control command is sent from a camera controller, the camera control unit 1034 transfers this command to the camera 1016 via the camera interface 1036 (step S251), whereby the camera 1016 is driven to attain the state designated. In a case where the response from the camera 1016 contains status parameters that are the result of control of the camera, these parameters are saved in the memory device 1032. Otherwise, a status-parameter request command is sent to the camera 1016 and saved in the memory device 1032 (step S252). After the camera control command is executed, notification of end of command execution is sent back to the camera controller along with status parameters stored in the memory device 1032 (step S253).

Here the camera controller sends the camera management unit a camera control command adapted to the control command system of the camera to be controlled. Ordinarily, however, the control command system differs depending upon the camera product and, in general, different camera products are connected to the network. In such case the camera controller would send the camera management unit an abstracted or normalized control command and the camera control unit of each camera management unit would translate or convert this control command to one conforming to the camera connected thereto.

Figure 32:
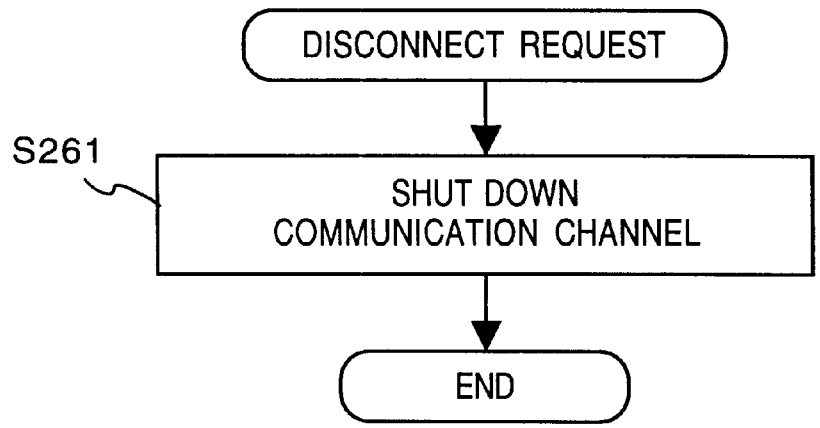
FIG. 32 is a flowchart showing the operation of the camera management unit in response to a disconnect request.

FIG. 32 is a flowchart showing the operation of the camera management unit in response to a disconnect request. When a disconnect request is issued, the communication control unit 1030 of the camera management unit executes disconnect processing, such as processing for shutting down the communication channel (step S262). At this time processing such as positioning the camera at the home position is executed.

Though not described, a video/audio signal is transmitted over the LAN 1010 upon being compressed and encoded. More specifically, the camera management units 1012, 1014 compress and encode a video/audio signal to be transmitted and outputs the compressed signal to the LAN 1010. The camera controllers 1020, 1022 decompress the compressed video/audio signal from the LAN 1010 and apply the decompressed signal to the monitor 1050 and speaker 1052.

According to the second embodiment, the camera management units 1012, 1014 and camera controllers 1020, 1022 are interconnected by the Ethernet LAN. However, it should be obvious that an ISDN or public telephone line may be used instead. In such case telephone numbers can be used as the information uniquely defining the camera management units 1012, 1014.

According to the second embodiment, the camera management unit and camera controller are described as being separate devices. However, it should be obvious that these can be incorporated in a single personal computer or work station. In such case there would be no need to rely upon a LAN. If the video camera is connected to the input/output interface, e.g., a serial port, of the personal computer or work station, then the input/output interface may be opened and assigned as a logical communication channel, thereby allowing operation to be performed in the same manner as when a connection is made via the LAN.

Many modern personal computers come equipped with a video camera (and microphone) in order to be prepared for video conferencing. It should be obvious that in a case where such a computer is connected to a LAN, the user's own computer can be used as the camera controller and another party's computer can be used as the camera management unit.

In this embodiment, the display of the photographic area frame 1078 on the camera operation screen is made to conform to the present status (pan, tilt and zoom) of the camera when the camera management unit and camera controller are logically connected. However, an arrangement may be adopted in which these are matched by specific initialization processing.

An arrangement may be adopted in which, when the camera management unit and camera controller are disconnected after having been temporarily connected, camera status (pan, tilt and zoom) prevailing at the moment of disconnection is stored in the memory device 1032 and/or memory device 1042, the camera is controlled, the next time it is connected, so as to assume the camera status which prevailed at the previous disconnection, and the frame 1978 is displayed on the camera operation screen 1060. In a case where there are a plurality of camera controllers, it is possible that, between connections to the same camera, another camera controller may be connected to this camera and used to control it. When the camera status which prevailed at the previous disconnection is thus stored in memory and the camera re-connected, the camera will be controlled to assume the same status. As a result, camera control can be resumed smoothly.

In the second embodiment, it is stated that only one camera is connected to one camera management unit. However, it should be obvious that a plurality of cameras may be connected to one camera management unit, as in the first embodiment. The only problem that arises is the processing capability needed for the video signals, which present the heaviest processing load.

Figure 33:
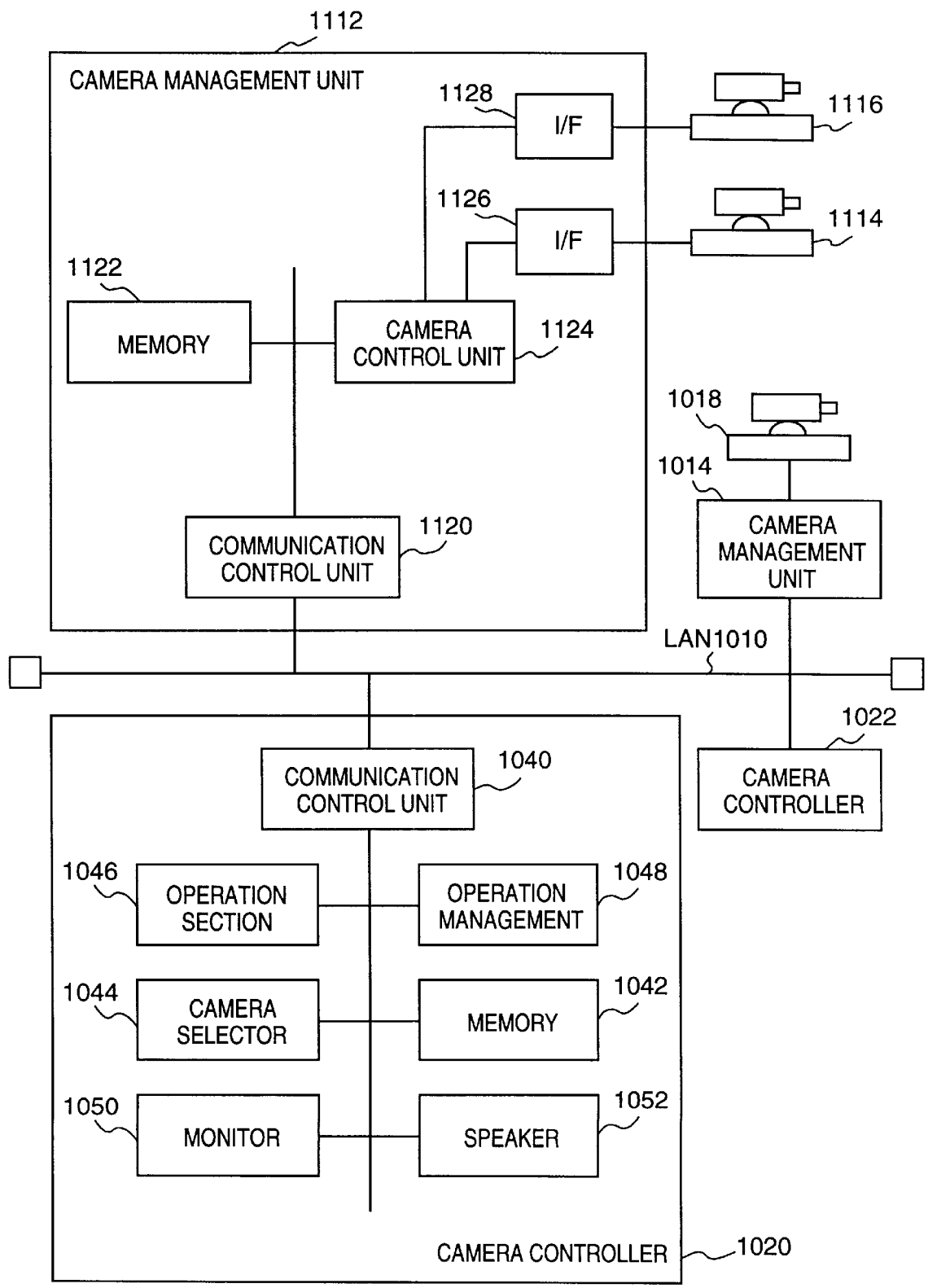
FIG. 33 is a block diagram schematically showing a modification of the second embodiment.

FIG. 33 is a block diagram schematically showing a modification of the second embodiment. Here a camera management unit 1112 is connected to the LAN 1010 and manages two video cameras 1114, 1116. The camera management unit 1112 has a communication control unit 1120 and a memory device 1122 similar to the communication control unit 1030 and memory device 1032, respectively, as well as a camera control unit 1124 having the ability to control two or more cameras, and camera interfaces 1126, 1128 for connecting the cameras 1114, 1116, respectively, to the camera control unit 1124. Other elements identical with those shown in FIG. 23 are designated by like reference characters.

In order to specify a camera to be controlled in a case where the single camera management unit 1112 thus manages the plurality of cameras 1114, 1116, it will suffice to specify the camera management unit and to add information which specifies the particular camera among the plurality of cameras managed by this camera management unit.

Of course, in a case where the communication control unit 1120 of the camera management unit 1112 is capable of establishing logical communication channels the number of which is equal to the number of cameras 1114, 1116, connect requests from a plurality of camera controllers to different cameras can be dealt with simultaneously.

Similarly, with regard also to the camera controllers 1020, 1022, it should be obvious that it is easy to provide extended functionality so that a plurality of cameras can be controlled simultaneously.

Figure 34:
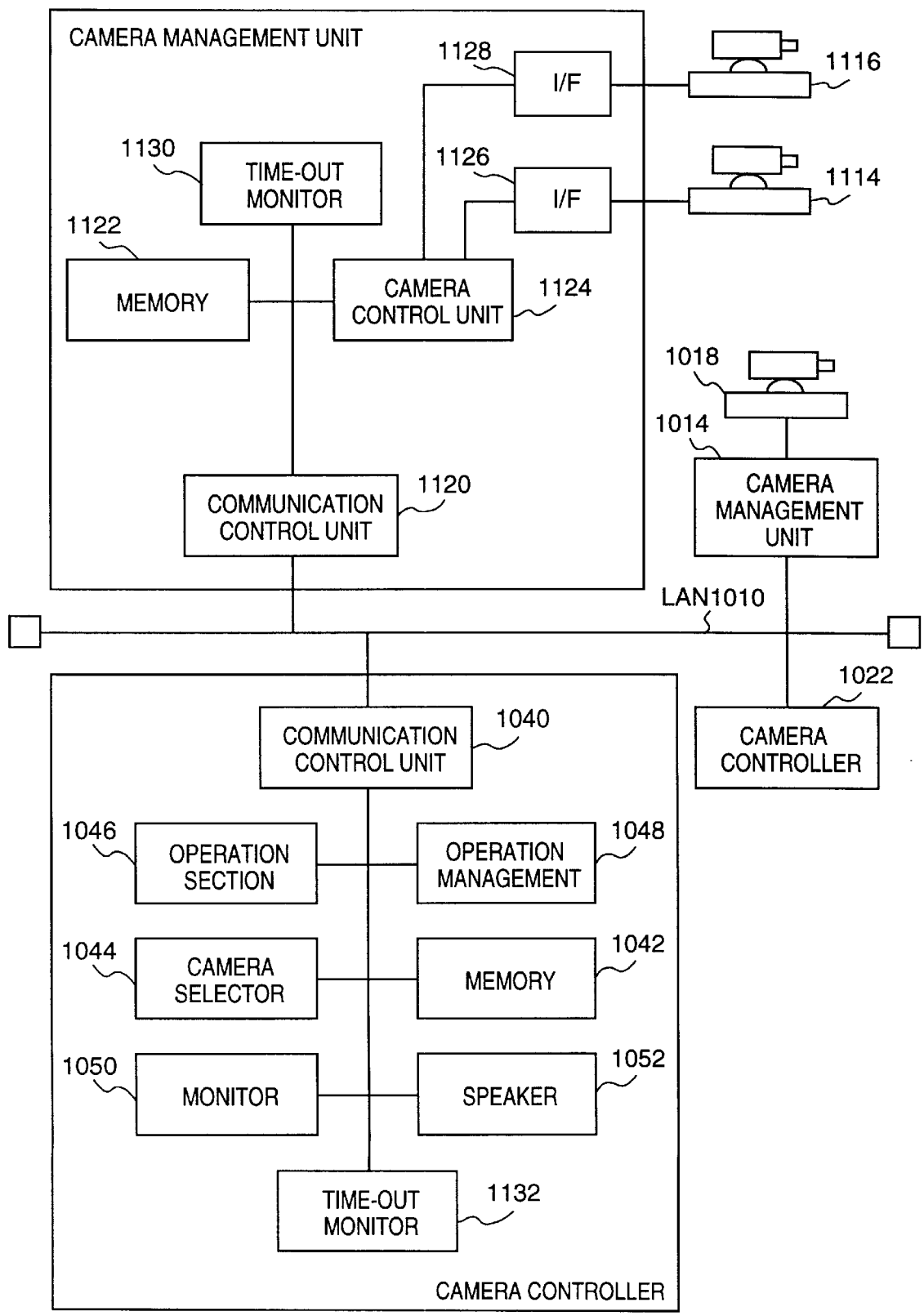
FIG. 34 is a block diagram schematically showing another modification of the second embodiment.

In each of the foregoing embodiments, the arrangement is such that as long as a camera controller that has taken control of a certain camera does not expressly release the camera from control, another camera controller cannot remotely control this camera. This difficulty can be avoided by providing the camera management unit and/or camera controller with time-out monitoring units 1130, 1132, as shown in FIG. 34, and limiting the time the camera can be monopolized by any camera controller. The time-out monitoring units 1130, 1132 measure elapsed time from the moment a connected camera has its settings newly changed or is newly controlled as by being rotated or zoomed. When the elapsed time has exceeded a predetermined length of time, the camera control unit of the camera management unit or the control management means of the camera controller is made to forcibly disconnect the camera.

Figure 35:
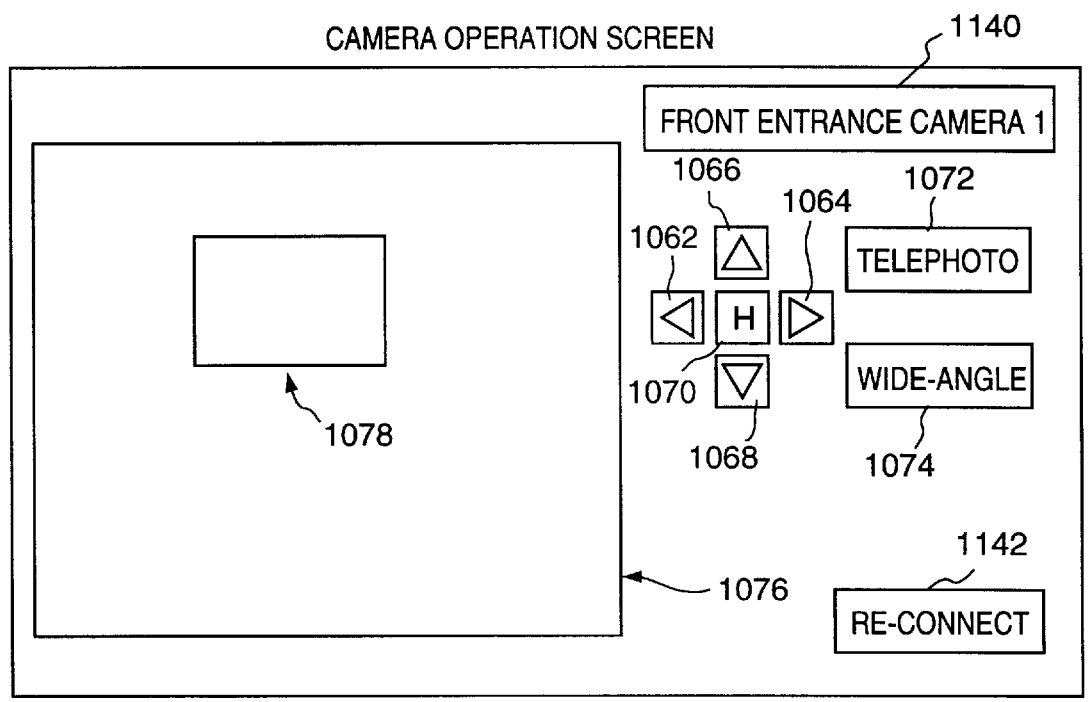
FIG. 35 shows an example of a camera operation screen according to the modification of FIG. 34.

If the length of time for time-out is set to be comparatively short, automatic disconnection occurs frequently and it is troublesome to make the re-connection whenever the time runs out. To avoid this, information specifying the camera previously connected is recorded in the memory device 1042 of the camera controller and, as shown in FIG. 35, the camera operation screen is provided with a field 140 for displaying the target camera that is to be re-connected and a radio button 1142 for designating re-connection. As a result of this expedient, a camera that has been disconnected automatically owing to elapse of time can be re-connected by a single click on the radio button 1142 as long as this camera is not presently being occupied by another camera controller.

The terminal or camera controller and camera management unit in the first embodiment, the modification thereof and the second embodiment are controlled almost entirely by a program. In other words, the invention of this application can be realized even by supplying a system or apparatus with a storage medium storing the program codes of software which implements the functions of the foregoing embodiments, and having the computer (or CPU, MPU) of this system or apparatus read out an execute the program codes stored on the storage medium.

In this case, the program codes read out of the storage medium implement the functions of the embodiments, and the storage medium storing the program codes constitutes the invention.

Further, the storage medium, such as a floppy disk, hard disk, optical disk, magneto-optical disk, CD-ROM, CD-R, magnetic tape, non-volatile memory card or ROM, can be used to provide the program codes.

Furthermore, besides the case where the aforesaid functions of the embodiments are implemented by executing the program codes read by the computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

In a case where the present invention is applied to the aforesaid storage medium, the storage medium stores program codes corresponding to the flowcharts described above.

Thus, in accordance with the present invention as described above, a list used to select one video camera from a plurality thereof is displayed in such a manner that the camera names appear in order of decreasing frequency of use. This facilitates selection.

Further, in a conference between two parties, means is provided for selectively designating whether the video camera of the other communicating party or the user's own video camera is to be placed under control. This makes it possible to switch between controlled cameras quickly.

Further, in a system in which a plurality of remotely controllable video cameras and at least one camera controller are connected via a communication line, any camera can be selected and controlled through a simple operation.

As many apparently widely different embodiments of the present invention can be made without departing from the spirit and scope thereof, it is to be understood that the invention is not limited to the specific embodiments thereof except as defined in the appended claims.

What is claimed is:

1. A camera control system having at least one camera unit connected to a predetermined line, and at least one control unit for controlling said camera unit via said line, said camera unit comprising:

a camera capable of being panned, tilted and zoomed; and management means for managing said camera and controlling said camera in accordance with a control command from said control unit; and said control unit comprising:

display means for displaying a user interface which includes symbol buttons for controlling said camera unit;

memory means for storing camera names of connectable cameras and address information for specifying each camera unit on the line;

accumulating means for accumulating, for each camera, time during which a camera is controlled, so as to obtain the total time period of controlling each camera in the past;

sorting means for deciding an order of displaying of the camera names on a list based upon a length of time period accumulated by said accumulating means;

list display means for displaying a list of the camera names that is in accordance with the order of display decided by said sorting means;

detecting means for detecting whether any camera name in the displayed camera list has been designated; and sending means for converting input information, which has been designated on the displayed user interface, to information having a predetermined format and sending the information having the predetermined format to a camera unit designated by address information corresponding to a camera name detected by said detecting means.

2. The system according to claim 1, wherein said counting means comprises:

first arithmetic means for calculating frequency of use by calculating number of times a selection is made from the camera list;

second arithmetic means for calculating frequency of use by calculating selection time of a camera under control;

third arithmetic means for calculating frequency of use by calculating number of times a camera under control is controlled; and designating means for designating any of said first, second and third arithmetic means.

3. The system according to claim 1, further comprising a prescribed non-volatile storage device for storing camera names of connectable cameras, address information for specifying each camera unit on the line, and frequency of use of each camera unit counted by said counting means.

4. The system according to claim 1, wherein said management means of the camera unit includes means which, in a case where said camera is driven in accordance with a control command from said control unit, sends status information indicative of status of said camera to the control unit which issued said control command.

5. The system according to claim 4, wherein said control unit comprises:

first area display means for displaying a first area representing a range over which photography is possible by a camera unit under control;

receiving means for receiving status information from said camera unit under control after information designated on said user interface has been sent to said camera unit under control; and second area display means which, in accordance with the received status information, displays a second area, which is indicative of present photographic position and range, within said first area displayed by said first area display means.

6. The system according to claim 1, wherein said management means of the camera unit comprises:

determination means which, in a case where a connect request command has been received from said control unit, is for determining whether the currently prevailing camera has been connected to another control unit; and means for sending the control unit which issued said connect request command information indicative of connect disable if said determination means determines that the currently prevailing camera has been connected to another control unit, and control information indicative of connect enable if said determination means determines that the currently prevailing camera has not been connected to another control unit.

7. A camera control system having one or more camera management units for connecting and managing a camera capable of being at least one of panned, tilted and zoomed via two communication channels, one being an image transmission channel for transferring a sensed image, the other being a control channel for controlling a camera, and a controller for controlling the camera connected to said camera management unit, wherein said controller comprises:

designating means for designating a desired camera management unit, said designating means including:
   determination means for determining whether or not a camera management unit for which the image transferring channel and the control channel have already been established exists; and
   issuing means, if said determination means determines that a camera management unit for which the image transferring channel and the control channel have already been established exists and this camera management unit differs from the designated camera management unit, for issuing a disconnection of only the control channel to said camera management unit for which the image transferring channel and the control channel have already been established, while maintaining the connection of the image transmission channel; and means for establishing connection to the camera management unit designated by said designating means.

8. The system according to claim 7, wherein said camera management unit comprises means which, in accordance with a control command from said controller, is for controlling panning, tilting and zooming of a connected camera as well as connection and disconnection of the image transferring channel and the control channel, and sending status information indicative of status of said camera to said controller.

9. The system according to claim 7, wherein said controller comprises:

first display means for displaying a maximum visual-field area over which photography is possible by panning, tilting and zooming of the camera associated with the camera management unit whose connection of the control channel has been established; and second display means for displaying a photographic area, which is based upon photographic position/size of said camera, in said maximum visual-field area.

10. The system according to claim 9, wherein said controller comprises:

means for issuing a request command, which requests camera status information, to said camera management unit whose connection of the control channel has been established, and receiving the status information from said camera management unit; and updating means for updating said first and second display means based upon the status information received.

11. The system according to claim 7, wherein after control of a camera has been completed, a connection of the control channel between the camera controller and the camera management unit having the camera under control is disconnected in response to a predetermined operation.

12. The system according to claim 7, wherein if camera control has not been performed for a predetermined period of time, the connection of the control channel is disconnected automatically.

13. The system according to claim 7, wherein said camera management unit has means for detecting elapse of a predetermined period of time and disconnecting a connection.

14. The system according to claim 7, wherein said controller has means for detecting elapse of a predetermined period of time and disconnecting a connection.

15. The system according to claim 7, wherein said camera management unit translates a control command from said controller and converts the command to a command suited to the camera connected.

16. A method of controlling a camera control system for controlling a plurality of cameras, comprising the steps of:

displaying a list of names of said plurality of cameras;

accumulating, for each camera, time during which the camera is controlled so as to obtain the total time period of controlling each camera in the past;

changing the camera list in an order in accordance with a length of the total time period accumulated in said accumulating step; and selecting a camera to be controlled from the camera list which has been changed in said changing step so as to display the camera names in the order of length of time period.

17. A method of controlling a camera control system having one or more camera management units for connecting and managing a camera capable of being at least one of panned, tilted and zoomed via two communication channels, one being an image transmission channel for transferring a sensed image, the other being a control channel for controlling a camera, and a controller for controlling the camera connected to said camera management unit, said method comprising the steps of:

designating a desired camera management unit;

determining whether or not a camera management unit for which the image transmission channel and control channel have already been established exists;

disconnecting only the control channel for the camera management unit having the established image transferring channel and control communication channel while maintaining the connection of the image transmission channel; and establishing connection to the camera management unit designated in said designating step.

18. A camera control system for controlling a camera capable of being at least one of panned, tilted and zoomed via a network, comprising:

operating means for operating the camera;

acquisition means for acquiring status information of the camera operated by said operating means;

memory means for storing said status information of the camera at the time when the operation of said operating means is completed; and issuing means for issuing a command to the camera so as to restore the status of the camera to the status corresponding to the status information stored in said memory means when re-connecting the camera to operate the camera.

19. The system according to claim 18, wherein said memory means is provided in an operating terminal.

20. The system according to claim 18, wherein said memory means is provided in a terminal having the camera.

21. A method for controlling a camera control system for controlling a camera capable of being at least one of panned, tilted and zoomed via a network, comprising the steps of:

operating the camera;

acquiring status information of the camera operated in said operating step;

storing said status information of the camera at the time when the operation in said operating step is completed; and issuing a command to the camera so as to restore the status of the camera to the status corresponding to the status information stored in said storing step when re-connecting the camera to operate the camera.

22. The method of claim 21, wherein said storing step is performed in an operating terminal.

23. The method of claim 21, wherein said storing step is performed in a terminal having the camera.

* * * * *